(12) United States Patent
Wasserman et al.

(10) Patent No.: US 6,864,900 B2
(45) Date of Patent: Mar. 8, 2005

(54) PANNING WHILE DISPLAYING A PORTION OF THE FRAME BUFFER IMAGE

(75) Inventors: Michael A. Wasserman, Redwood City, CA (US); Michael G. Lavelle, Saratoga, CA (US); Elena M. Ing, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 433 days.

(21) Appl. No.: 09/861,467

(22) Filed: May 18, 2001

(65) Prior Publication Data

US 2003/0043173 A1 Mar. 6, 2003

(51) Int. Cl.⁷ ............................ G09G 5/00; G09G 5/36
(52) U.S. Cl. .................................... 345/672; 345/559
(58) Field of Search ........................ 345/672, 686, 345/785, 684, 559, 786, 682, 681, 540, 545, 538

(56) References Cited

U.S. PATENT DOCUMENTS

| | | | |
|---|---|---|---|
| 4,586,036 A | * 4/1986 | Thomason et al. ............ 345/24 |
| 4,642,794 A | * 2/1987 | Lavelle et al. ............. 345/686 |
| 4,714,919 A | * 12/1987 | Foster ...................... 345/590 |
| 4,780,709 A | * 10/1988 | Randall ..................... 345/27 |
| 4,874,164 A | * 10/1989 | Miner et al. ............... 345/562 |
| 4,918,436 A | * 4/1990 | Johary ..................... 345/540 |
| 5,006,837 A | * 4/1991 | Bowers ..................... 345/590 |
| 5,083,119 A | * 1/1992 | Trevett et al. ............. 345/559 |
| 5,200,738 A | * 4/1993 | Fumoto et al. ............. 345/538 |
| 5,526,024 A | 6/1996 | Gaglianello et al. ........ 345/547 |
| 5,537,128 A | 7/1996 | Keene et al. ............... 345/89 |
| 5,544,306 A | 8/1996 | Deering et al. ............ 345/545 |
| 5,640,332 A | 6/1997 | Baker et al. ............... 345/559 |
| 5,727,192 A | 3/1998 | Baldwin ................... 345/522 |
| 5,757,381 A | * 5/1998 | Shoji et al. ................ 345/684 |
| 5,777,601 A | 7/1998 | Baker et al. ............... 345/603 |
| 5,790,110 A | 8/1998 | Baker et al. ............... 345/547 |
| 5,798,749 A | * 8/1998 | Minematsu et al. ........ 345/785 |
| 5,805,173 A | 9/1998 | Glennon et al. ............ 345/501 |
| 5,812,204 A | 9/1998 | Baker et al. ............... 348/453 |
| 5,920,302 A | * 7/1999 | Inoue et al. ............... 345/786 |
| 5,945,997 A | 8/1999 | Zhao et al. ................ 345/581 |
| 5,949,437 A | 9/1999 | Clark ...................... 345/502 |
| 5,956,046 A | 9/1999 | Kehlet et al. .............. 345/502 |
| 5,963,200 A | 10/1999 | Deering et al. ............ 345/213 |
| 6,020,901 A | 2/2000 | Lavelle et al. ............. 345/545 |
| 6,118,413 A | 9/2000 | Bril et al. .................. 345/596 |
| 2002/0070970 A1 | * 6/2002 | Wood et al. ............... 345/766 |

OTHER PUBLICATIONS

GDC Press Release via Web "GDC marks first North American public showing", "http://www.matrox.com/mga/media_center/press_rel/1990/g400_gdc.cfm".

Pacifica RAMDAC spec BT497/8 from Brooktree, Feb. 1996, 53 pages.

"Sun™ Elite3D Frame Lock and Buffer Swap Synchronization Installation Guide", Aug. 1999, 42 pages.

3D–RAM Spec 8 Press Release dated May 20, 1997, 2 pages.

3D–RAM Spec www.mitsubishichips.com/data/datasheets/memory/mempdf/ds/c99001.pdf, (date Aug. 1996 given in press release, see A3), 170 pages.

* cited by examiner

*Primary Examiner*—Michael Razavi
*Assistant Examiner*—Ryan Yang
(74) *Attorney, Agent, or Firm*—Meyertons Hood Kivlin Kowert & Goetzel, P.C.; Jeffrey C. Hood

(57) ABSTRACT

A graphics system and method for panning from one portion of a stored image to another portion of the image includes a frame buffer, one or more display devices, one or more raster parameter registers, and one or more raster parameter updaters. The image is stored in the frame buffer and each display device is configured to display less than the entire image. A panning operation is initiated by requesting an update of one or more of the raster parameter registers during a next blanking period.

23 Claims, 29 Drawing Sheets

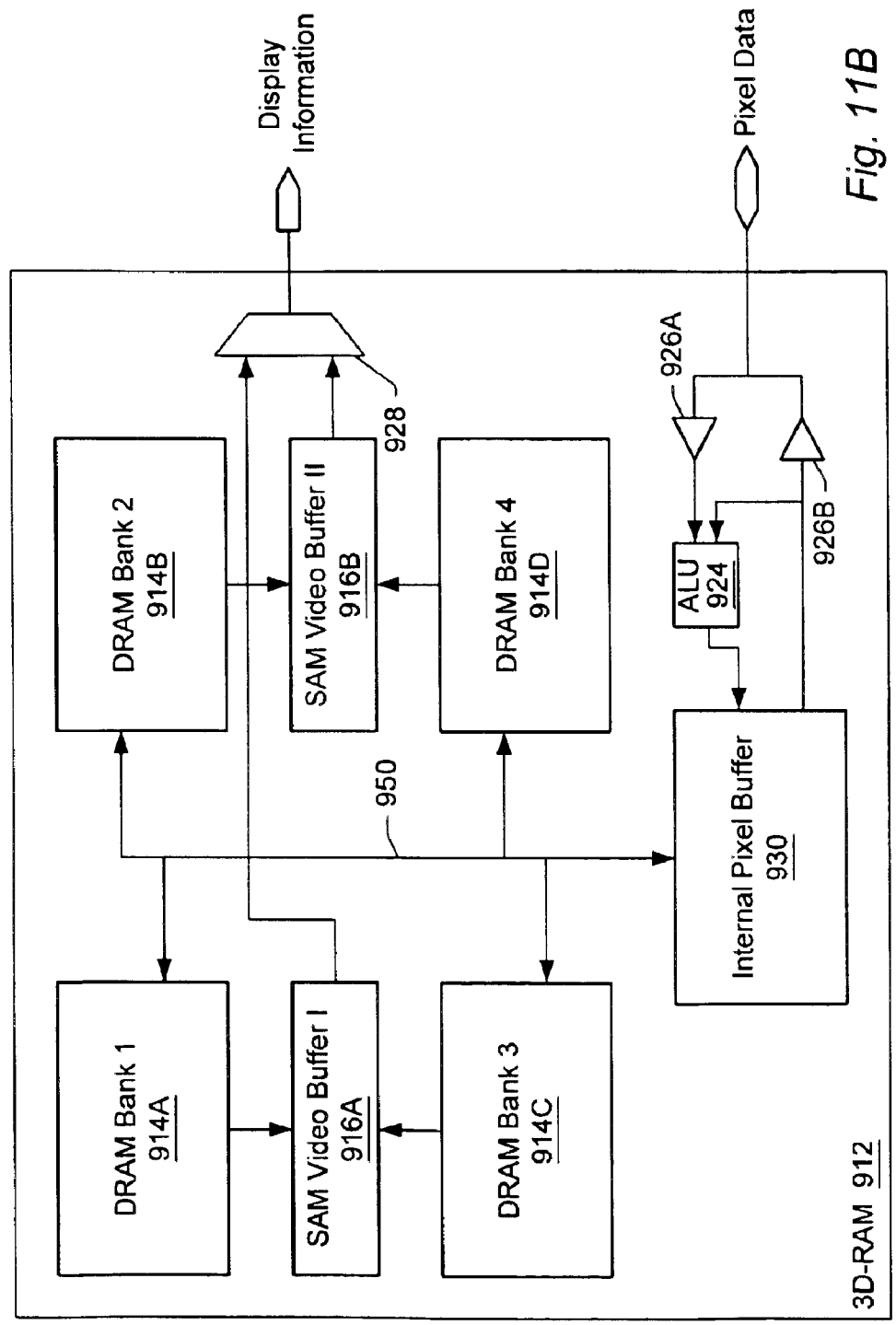

PANNING WHILE DISPLAYING A PORTION OF THE FRAME BUFFER IMAGE

BACKGROUND OF THE INVENTION

1. Field of the Invention

This invention relates to graphics systems and, more particularly, to graphics systems capable of supporting multiple display streams or channels.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modem graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating, "draw a box at these coordinates." The graphics system then draws the box, freeing the processor to perform other tasks.

Generally, a graphics system in a computer is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphics applications, and especially multimedia applications, has made high performance graphics systems a common feature in many new computer systems. Most computer manufacturers now bundle a high performance graphics system with their computing systems.

In many applications, it may be useful to have two monitors or displays connected to the same computer system. For example, in some graphical editing applications, it is desirable to use one monitor to show a close-up of an area being edited, while another monitor shows a wider field of view of the object or picture being edited. Alternatively, some users may configure one monitor to display the object being edited and the other monitor to display various palettes or editing options that can be used while editing. Another situation where multiple displays are useful occurs when several users are connected to a single computer. In such a situation, it may be desirable for each user to have their own display. In another situation, it may simply be desirable to have multiple displays that each display a different portion of an image in order to provide a larger display than would otherwise be possible. Another example is stereo goggles, which present different images to their wearer's left and right eyes in order to create a stereo viewing effect. These examples illustrate just a few of the many situations where it is useful to have multiple displays connected to the same computer system.

Given the complexity and expense of many graphics systems, it may be desirable to provide a graphics system that can support two displays without duplicating the entire graphics system. Thus, there is a need to be able to share portions of a graphics system between multiple display channels.

SUMMARY

Various embodiments of a graphics system that supports panning and a method of panning are disclosed. In one embodiment, a graphics system includes a frame buffer, one or more display devices, one or more raster parameter registers, and one or more raster parameter updaters. The frame buffer is configured to store an image and one or more display devices are each configured to display less than the entire image. Each raster parameter register is configured to store a control value that controls what portion of the image will be displayed on a respective one of the display devices. Each raster parameter updater is configured to update a respective one of the raster parameter registers by waiting for a current frame to end, and once the current frame has ended, writing an updated control value to the respective one of the raster parameters.

In one embodiment, in response to a user initiating a panning operation for one of the display devices, one or more raster parameter register updaters are configured to update their corresponding raster parameter registers.

In some embodiments, a user initiates computer-executable instructions to update one or more shadow registers to initiate a panning operation for one of the display devices. Each shadow register corresponds to a respective one of the raster parameter registers, and is configured to update its respective raster parameter register by copying a value from the shadow register to the respective raster parameter register.

In some embodiments, the raster parameter register updaters are configured to update their respective raster parameter register in response to receiving an indication of an end of field or an end of frame.

In some embodiments, a raster parameter register comprises: a screen address register that is configured to store a value that indicates whether a next frame of display information for a respective one of the display devices starts on an even or an odd line in the frame buffer, a display address generator register that is configured to store the starting address of a respective display device's portion of the image within the frame buffer, and a margin trimming register.

In some embodiments a raster parameter register updater is comprised in a frame buffer interface.

In one embodiment, a method of panning comprises the steps of storing an image in a frame buffer, displaying a first portion of the image on a display (where the first portion may be less than the entire image), and receiving an indication that initiates a panning operation to display a second portion of the image of the display. Performing a panning operation comprises waiting for a current frame to finish and updating the raster parameter registers during a next blanking interval by copying a value from one or more shadow registers to the corresponding raster parameter registers.

BRIEF DESCRIPTION OF THE DRAWINGS

FIG. 11B shows one embodiment of a 3D-RAM;

Figure 1:
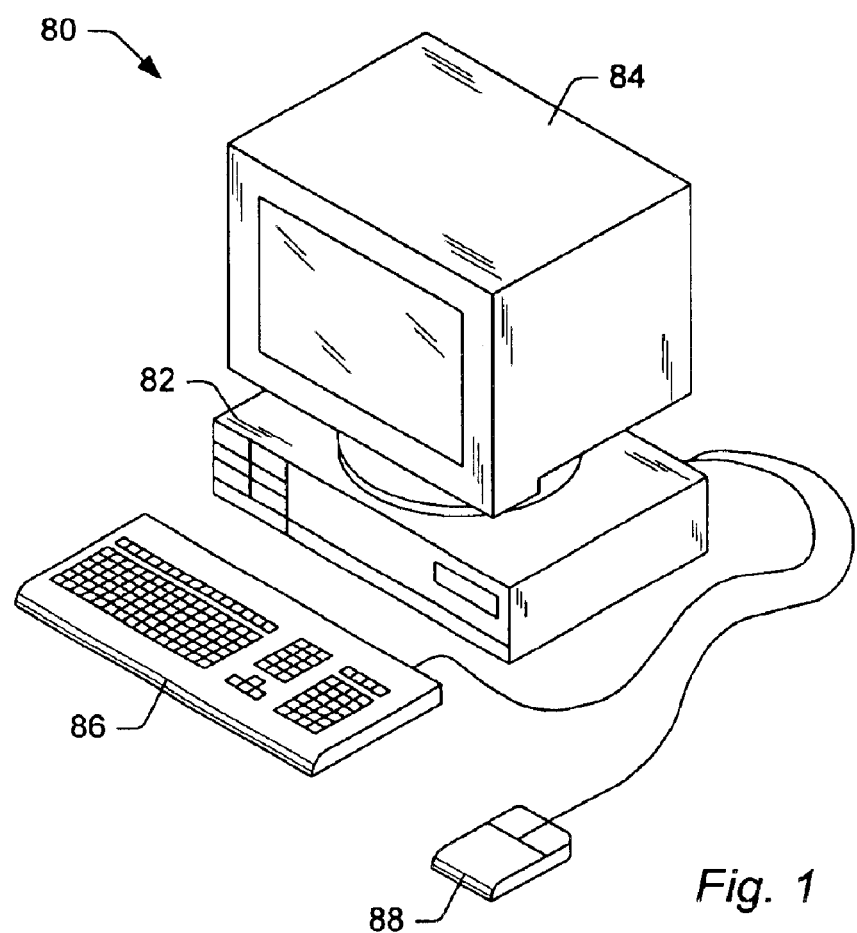
FIG. 1 is an illustration of a typical computer system and display.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Computer System—FIG. 1

Referring now to FIG. 1, one embodiment of a computer system 80 that includes a graphics system is shown. The graphics system may be comprised in any of various systems, including a computer system, network PC, Internet appliance, a television, including HDTV systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
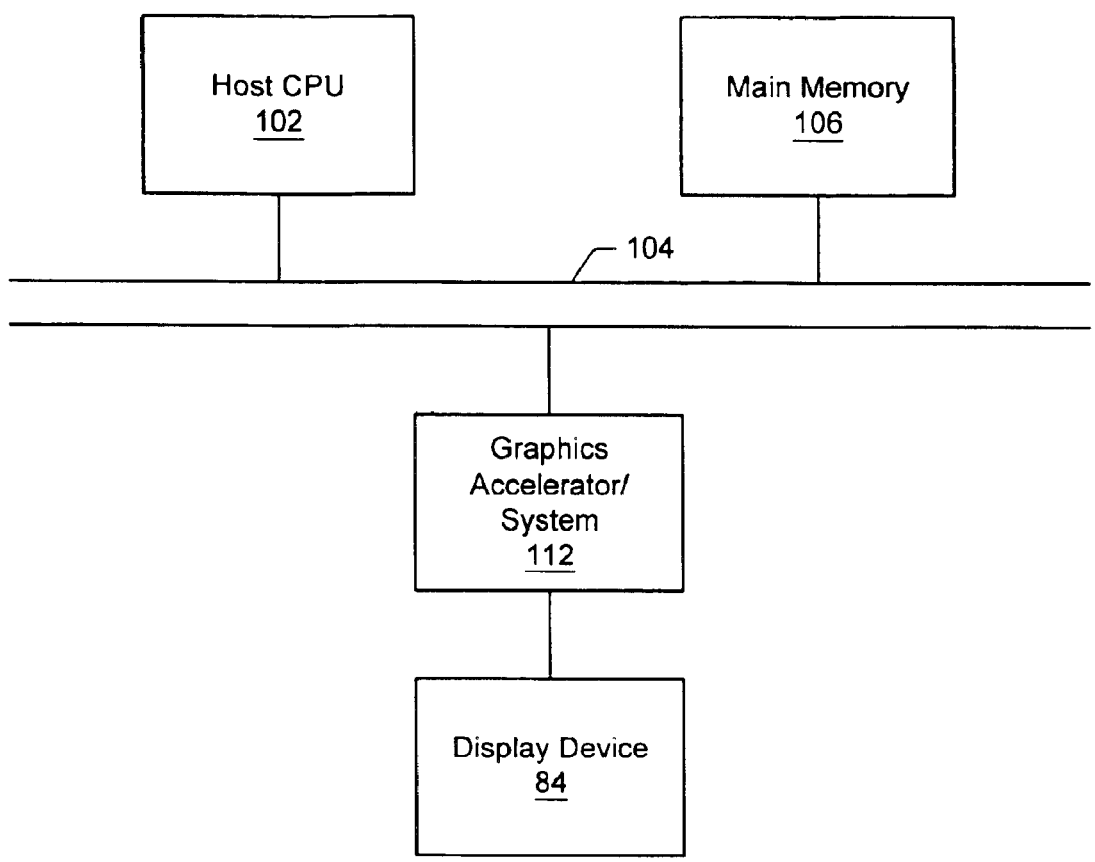
FIG. 2 is a drawing of one embodiment of a computer system.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternatively, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 3:
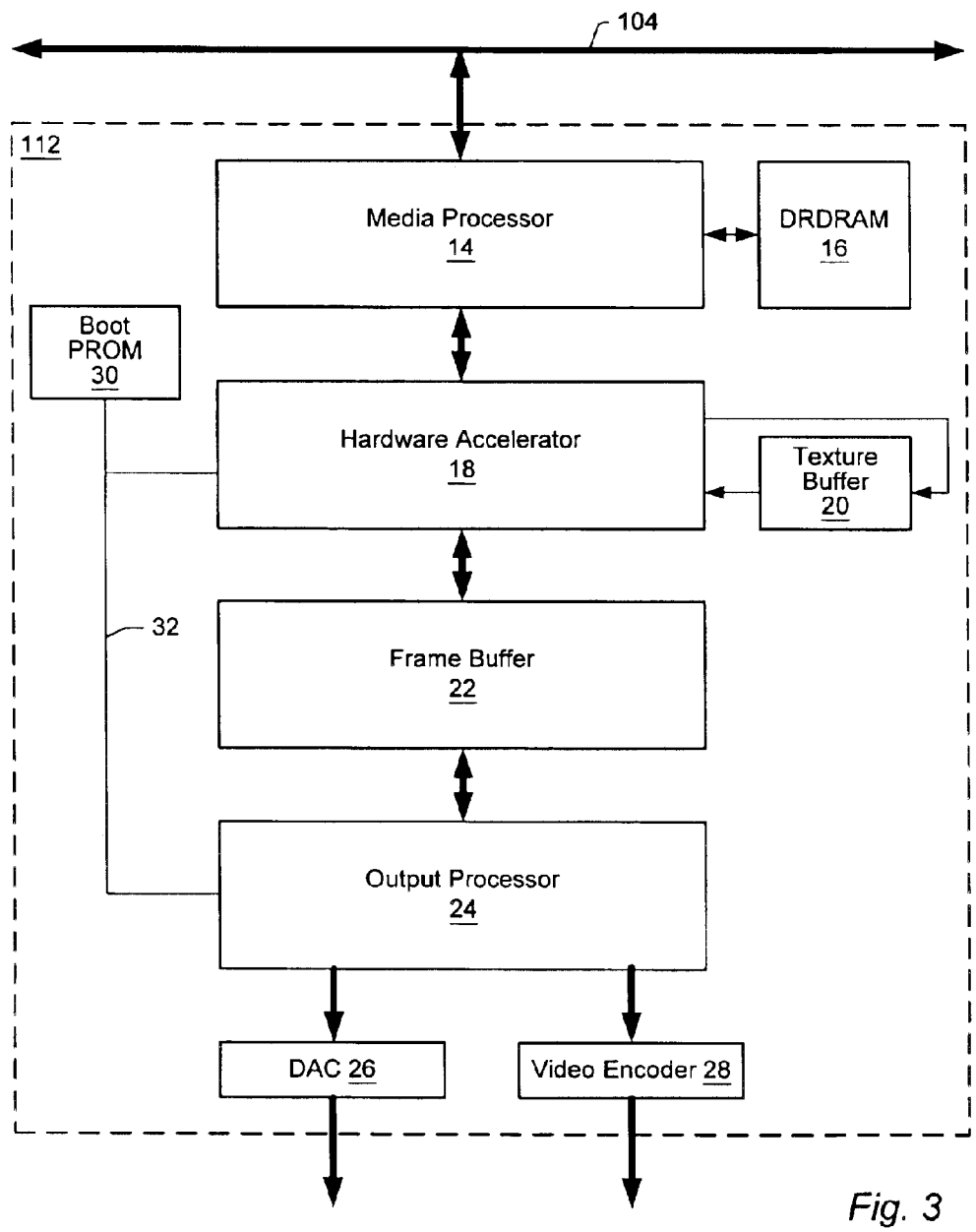
FIG. 3 illustrates one embodiment of graphics system.

Graphics System—FIG. 3

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more digital-to-analog converters (DACs) 26 and/or one or more video encoders 28. Media processor 14 and/or hardware accelerator 18 may be any suitable type of high performance processor (e.g., specialized graphics processors or calculation units, multimedia processors, DSPs, or general purpose processors).

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus (e.g., host bus 104 in FIG. 2) to enable graphics system 112 to communicate with a host system (e.g., computer system 80). More particularly, host bus 104 may allow a host processor to send commands to the graphics system 112. In one embodiment, host bus 104 may be a bi-directional bus.

Each functional block of graphics system 112 is described in more detail below.

Figure 4:
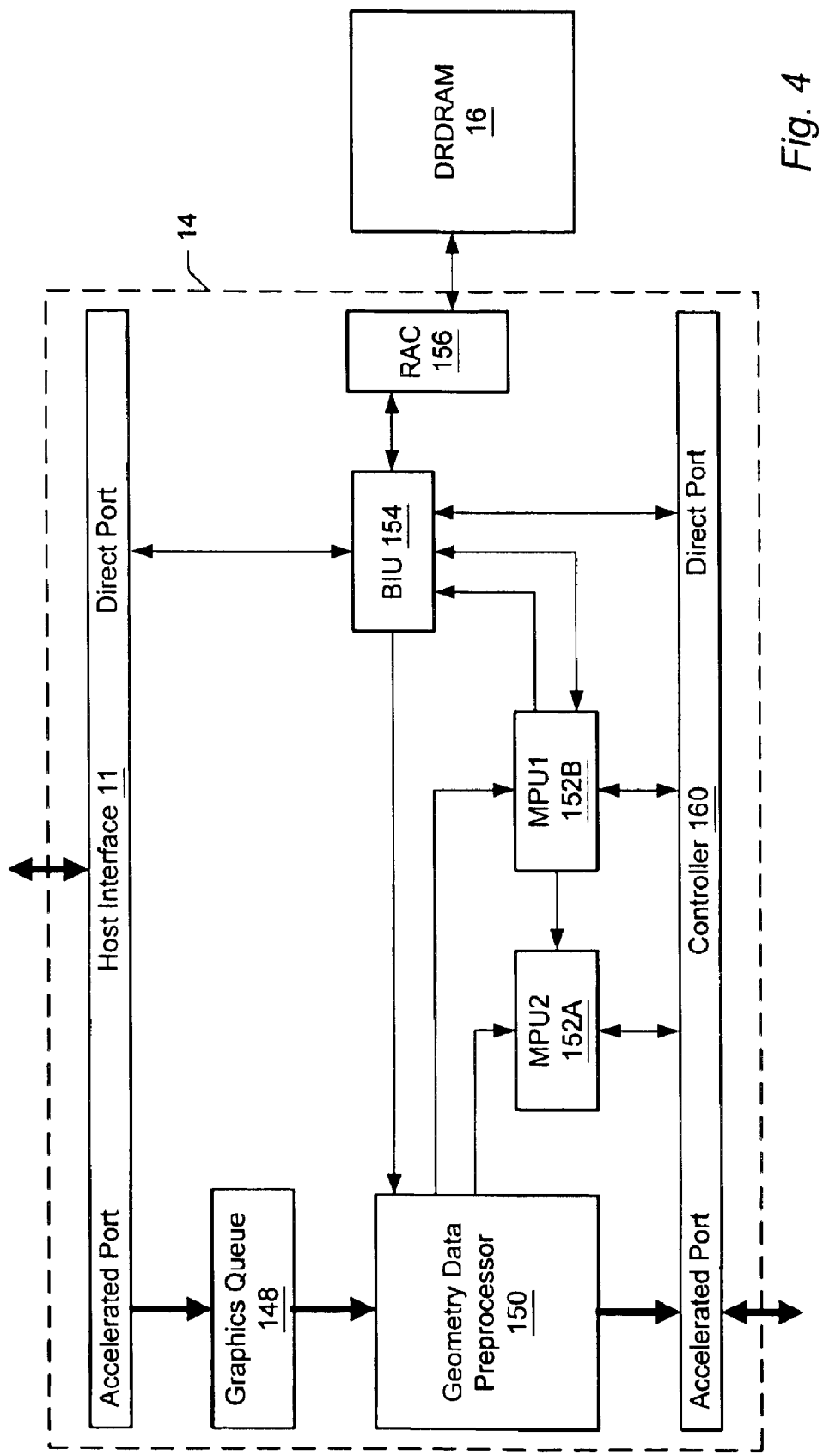
FIG. 4 illustrates one embodiment of a media processor that may be included in a graphics system.

Media Processor—FIG. 4

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform, lighting calculations, and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 5:
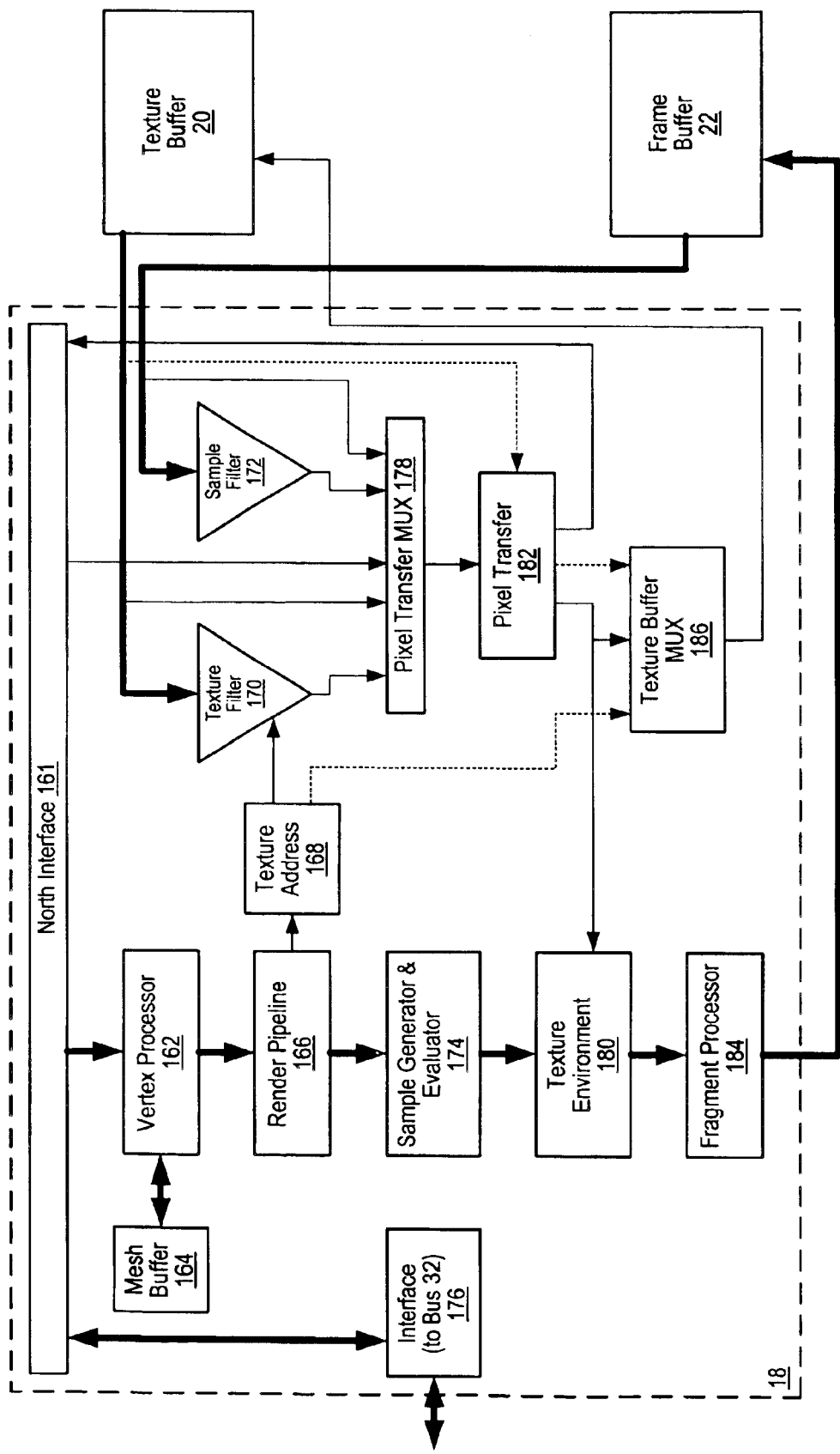
FIG. 5 illustrates one embodiment of a hardware accelerator that may be included in a graphics system.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data. Each of these features is described separately below.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture coordinates components).

In embodiments using supersampling, the sample generator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices (such as the M5M410092B 3D-RAM products developed by Mitsubishi). Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and supersample buffer. In some embodiments (e.g., if frame buffer 22 includes 3D-RAM devices), the frame buffer may be configured to perform certain operations on display information (e.g., transparency, WLUT, etc.).

Figure 6:
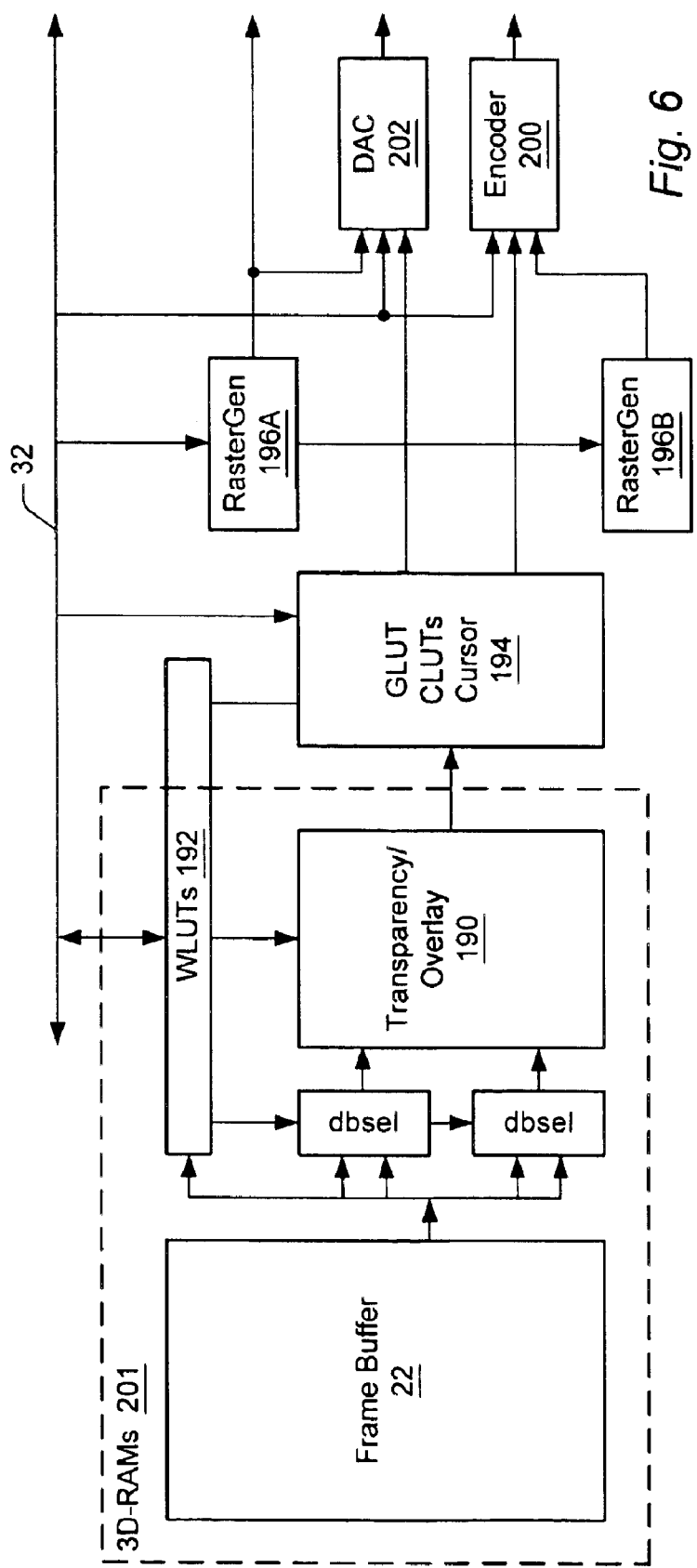
FIG. 6 illustrates one embodiment of a video output processor that may be included in a graphics system.

Output Processor—FIG. 6

An output processor 24 may also be included within graphics system 112. The output processor 24 may buffer and process display information output from frame buffer 22. For example, the output processor 24 may be configured to read bursts of pixels from frame buffer 22. The output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. The output processor 24 may also be configured to support two output streams to two displays using the two independent raster timing generators 196. For example, one raster (e.g., 196A) may drive a 1280×1024 CRT while the other (e.g., 196B) may drive a NTSC or PAL device with encoded television video.

DAC 202 may operate as the final output stage of graphics system 112. The DAC 202 translates the digital pixel data received from GLUT/CLUTs/Cursor unit 194 into analog video signals that are then sent to a display device. In one embodiment, DAC 202 may be bypassed or omitted completely in order to output digital pixel data in lieu of analog video signals. This may be useful when a display device is based on a digital technology (e.g., an LCD-type display or a digital micro-mirror display).

DAC 202 may be a red-green-blue digital-to-analog converter configured to provide an analog video output to a display device such as a cathode ray tube (CRT) monitor. In one embodiment, RGB DAC 202 may be configured to provide a high resolution RGB analog video output at dot rates of 240 MHz. Similarly, encoder 200 may be configured to supply an encoded video signal to a display. For example, encoder 200 may provide encoded NTSC or PAL video to an S-Video or composite video television monitor or recording device.

In other embodiments, the output processor 24 may output pixel data to other combinations of displays. For example, by outputting pixel data to two DACs 202 (instead of one of each of DAC 202 and encoder 200), video output processor 24 may drive two CRTs. Alternatively, by using two encoders 200, video output processor 24 may supply appropriate video input to two television monitors. Generally, many different combinations of display devices may be supported by supplying the proper output device and/or converter for that display device.

Dual-Channel, Demand Driven Output Processor

In many applications, it may be desirable to share a single graphics system such as graphics system 112 between multiple display channels. Furthermore, it may be desirable to share a single graphics system between two or more independent display channels that do not have synchronized blanking intervals.

In order to serve multiple independent display channels, it may be beneficial to present data to each channel based on that channel's actual demand as opposed to its theoretical demand. A particular channel's theoretical demand is typically a precalculated ratio of how many pixels that channel needs, on average, per cycle. Theoretical demand ignores the fact that a particular display channel may require more pixels at certain times and less pixels at others. For example, a channel may not require pixels during the cycle(s) that occur during vertical and/or horizontal blanking periods or intervals (i.e., the period between each frame and/or line of display data). That channel's actual demand during the non-blanking periods (i.e., the periods during which display data is being displayed) may thus be higher than the average demand in the precalculated ratio reflects. Similarly, that channel's actual demand during the blanking interval may be less than its theoretical demand.

The difference between actual and theoretical demand becomes important when multiple display channels are being served from the same frame buffer. When display channels with synchronized blanking intervals are served based on theoretical demand, when one channel stalls for a blanking interval, the other channel stalls, too, and thus both build up a surplus of output data during the blanking interval that they may then use during their higher-demand, non-blanking interval. However, if channels that do not have synchronized blanking intervals are served based on their theoretical demand, this beneficial build-up of data may not occur for one or more of the channels. For example, one channel may end up without any display data being available when it is needed, while at the same time another channel may have a surplus of display data available during a blanking interval.

Figure 7:
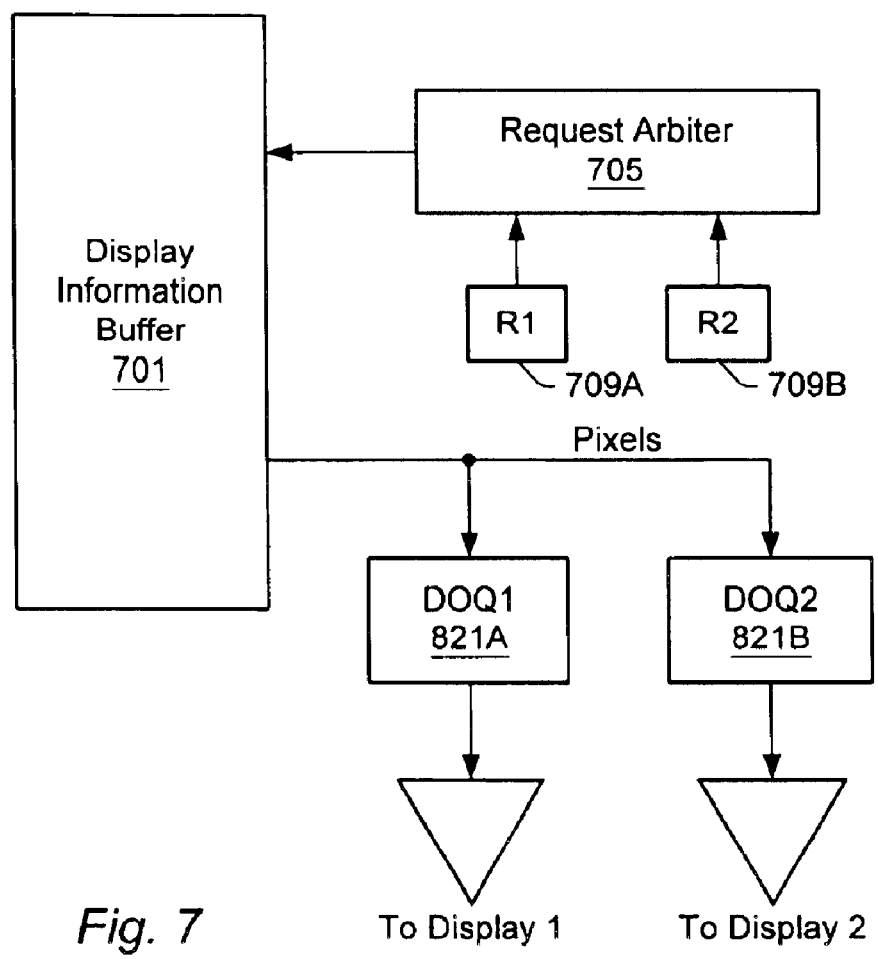
FIG. 7 shows one embodiment of a dual-channel, demand driven video output processor.

Thus, in order to adequately serve independent displays, it may be beneficial to serve the displays based on their actual, not theoretical, demand. FIG. 7 shows an example of one embodiment of a graphics system configured to serve two independent display channels based on their actual demand. Note that even though the system shown in FIG. 7 is described as allowing displays with independent blanking intervals to share the same frame buffer, the system may also be compatible with displays that do have synchronized blanking intervals.

As shown in FIG. 7, a display information buffer 701 stores data for both channels, A and B. The display information buffer 701 may be configured to output data to one of the channels in response to receiving a request from one of the channels. For example, in one embodiment, the display information buffer 701 may be a frame buffer configured to output bursts of display information. In another embodiment, the display information buffer 701 may be a pixel buffer configured to output pairs of pixels.

Two requesters 709 may be configured to assert requests based on a corresponding channel's actual demand for display information. An arbiter 705 intercepts the channels' requests and selects one of the channels' requests to forward to the display information buffer 701. In one embodiment, the arbiter 705 determines which request to forward by determining which channel is neediest, i.e., which channel needs display data the soonest. For example, if the channels each have a display data output queue, the neediest channel may be the channel with the lowest level of data in its queue.

The requesters 709 for each channel may be configured to assert a request when certain conditions occur. For example, a channel's requester 709 may begin asserting a request after a vertical blanking period has finished and continue asserting requests until the beginning of the next vertical blanking interval. However, in many embodiments (e.g., embodiments in which the display information buffer 701 is configured to output bursts of graphics data), it may be preferable to have each channel structure its requests so that it can prefetch data. By prefetching data, each channel may be able to ensure that its data needs are met by taking into account the latency of the request process and the delay that may result from having to wait for another channel's request(s) to be served. Thus, in these embodiments, the requesters 709 may be configured to begin asserting requests at some time before the end of a vertical blanking interval and to cease asserting requests at some time before the beginning of the next vertical blanking interval.

In another embodiment, the requesters 709 may be configured to assert a request when their corresponding channel's level of display information in its display output queue 821 falls below a certain threshold. For example, requester 709A may be configured to assert a request when the level of display output queue 821A falls below half full.

Figure 8:
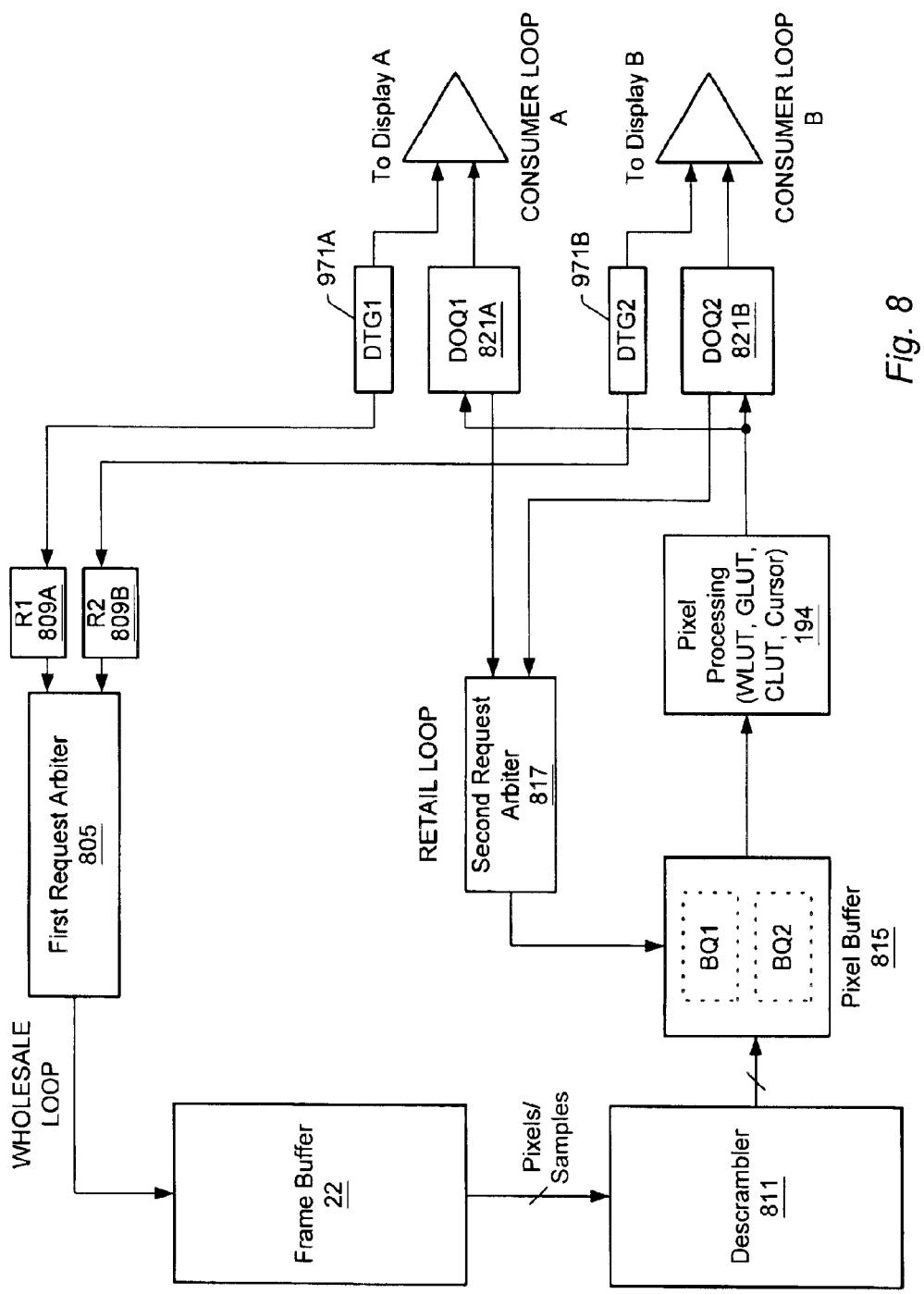
FIG. 8 illustrates another embodiment of a dual-channel, demand driven video output processor.

FIG. 8 shows another embodiment of a shared output pipeline. FIG. 8 shows an output processor similar to that shown in FIG. 6, with the addition of several requesters 809 and arbiters 805 and 817, and the inclusion of a pixel buffer 815. In this embodiment, two display streams share graphics system resources. There are two stages of shared resources, referred to as the "wholesale" loop and the "retail" loop. These loops are illustrated in FIG. 8, as are final "consumer" loops for each display channel. The wholesale loop may be configured to output relatively large amounts of display information (e.g., bursts) in response to a request, while the retail loop may operate using smaller transfers (e.g., pairs of pixels). Thus, by requesting data from the wholesale loop, a channel may prefetch display information in anticipation of its actual demand. The wholesale loop's fairly large granularity (e.g., bursts of data) may encourage prefetching, because a channel that fails to request data soon enough from the wholesale loop may not have enough display information available for display at a later time. The finer granularity of the retail loop's request system allows more fine-tuning based on each channel's current demand.

In the wholesale loop, the two streams each assert requests for the frame buffer 22 to output a certain amount of display information such as pixels or samples. Each stream's requester 809 may be configured to assert a request in response to certain conditions that indicate each particular stream's data requirements. For example, each channel's requester 809 may be configured to request display information far enough in advance that, assuming the maximum possible latency of the wholesale loop, the channel will receive enough pixels when they are needed. For example, in one embodiment, each channel's requester 809 may be configured to begin asserting requests slightly before the end of a vertical blanking interval for that channel in order to accurately prefetch data. Similarly, since the data is being prefetched, each channel's requester may be configured to cease issuing requests slightly before the beginning of the vertical blanking interval. During these request times, each channel's requester may also concentrate requests between the time just before the end of a horizontal blanking period and just before the next horizontal blanking period begins, depending on the granularity of the wholesale loop. Multiple requests may be issued for each channel in order to retrieve a full frame from the frame buffer 22. By ceasing requests during the blanking interval, additional resources in the output processing pipeline may become available to perform operations normally performed during the blanking interval such as multi-buffer synchronization and WLUT update posting.

Thus, each channel's requester 809 outputs a request to the frame buffer 22. The arbiter 805 controls which, if any, of these requests is actually forwarded to the frame buffer 22. The arbiter 805 may estimate which channel will run out of pixels the soonest, and pass that channel's request to the frame buffer 22. For example, in one embodiment, the arbiter may receive a count of the number of valid blocks in that channel's block queue (BQ1 and BQ2) in the pixel buffer 815. If the number of blocks is above a certain threshold, the arbiter 805 may decide that channel is not "needy" and thus not forward its request. If, however, the number of valid blocks is below the threshold, the channel is needy and its request may be forwarded. If both channels have asserted requests at the same time, the arbiter 805 may first determine if either channel's block count is below the threshold. If neither channel is needy, the arbiter 805 may determine that neither request should be forwarded. If instead only one channel qualifies as needy, that channel's request may be forwarded. However, if both channel's block counts are below the threshold, the arbiter 805 may compare the valid block counts for each channel. The channel with the greater deficit (below the threshold) of blocks is the neediest channel, and its request may be forwarded. The threshold level may be selected based on the latency of the later stages in the output pipeline. For example, the threshold level may be a level that keeps enough display information in a block queue that the corresponding channel receives enough display information when it needs it, despite the latencies in the retail and consumer loops.

In some embodiments, the arbiter 805 may forward a channel's request by asserting several signals to the frame buffer 22. For example, in one embodiment, the arbiter 805 may assert both a burst request and a signal indicating which of the channels the burst request corresponds to. Furthermore, the arbiter 805 may also assert a signal indicating what type of burst request is being asserted. Examples of types of burst requests include: start of new frame, start of additional fields in frame, next burst in stream, last burst in scan, end of scanline, and end of field.

The frame buffer 22 is configured to output display information in response to receiving a request forwarded by the arbiter 805. In some embodiments, the frame buffer 22 may store the display information as pixels or portions of pixels. In other embodiments, the frame buffer 22 may store display information as samples. Depending on the embodiment, the frame buffer 22 outputs a certain amount and type of display information in response to a received request. For example, in one embodiment, the frame buffer may output display information in bursts.

In one embodiment, a display address generator and the frame buffer interface (not shown) may process the display information requests. The display address generator may track the current address of each channel's graphics data, so that when a request from that channel is received, the appropriate data can be output from the frame buffer 22. Thus, after a request is serviced, the display address generator may update the address for that channel's data. The frame buffer interface may control the actual graphics data transfer operation. The frame buffer interface may also, in one embodiment, send an acknowledgement in response to receiving a request. The display address generator and/or frame buffer interface may be included in a device such as hardware accelerator 18.

In the illustrated embodiment, the data stored in the frame buffer 22 may be additionally processed before actually being output to a display. For example, in one embodiment, pixel data may not be stored in the frame buffer 22 in raster order. As a result, once the out-of-order pixel data has been output from the frame buffer 22, it may pass through a descrambler 811, as will be discussed in more detail below. The descrambler 811 may be configured to correctly order the pixels within a certain grouping of data (e.g., correctly order pixels within each block).

The descrambled graphics data may then be sent to a pixel buffer 815. The pixel buffer 815 may be implemented as a shared buffer (as opposed to a partitioned buffer), and thus the channels' data streams may be physically intermingled within the buffer 815. For example, each channel's data stream may be implemented as a linked list. While this configuration may provide optimal use of the storage within the buffer 815, it may be hard to implement. Thus, in another embodiment, the pixel buffer 815 may be partitioned so that each data stream has its own dedicated storage space. While this embodiment may not optimize the use of the space available in the pixel buffer 815, it may be easier to implement than a shared buffer. Generally, the pixel data stored in the pixel buffer 815 may be described as being stored in a block queue for each channel (BQ1 and BQ2), regardless of how the pixel buffer 815 is actually shared between the channels.

As part of the retail loop, each channel may be able to request data from the pixel buffer 815. In order to serve both channels, a pixel request arbiter 817 may monitor the channels' pixel requests and choose one of the requests to forward to the pixel buffer 815. Like the wholesale loop's arbiter 805, in one embodiment, the pixel request arbiter 817 may arbitrate between the two channels by selecting the neediest channel's request. The neediest channel is the channel that needs the most pixels in the shortest amount of time. In one embodiment, the pixel request arbiter 817 may determine which channel is neediest based on the level of data in that channel's display output queue 821. The pixel request arbiter 817 may also control which pixel request is forwarded to the pixel buffer 815 based on which of the channels have pixel data available from the pixel buffer 815. For example, if both channels have data available and request pixels at the same time, the arbiter 817 may be configured to alternate between the channels' requests.

Table 1 shows an example of how the pixel request arbiter may operate according to another embodiment.

TABLE 1

Pixel request arbiter output according to one embodiment.

| Requests | Stall | Last Service Request | BQ1 Data Ready | BQ2 Data Ready | Next Output |
|---|---|---|---|---|---|
| None | X | X | X | X | No Reads |
| X | 1 | X | X | X | No Reads |
| PR1 | 0 | X | 1 | X | Read from BQ1 |
| PR1 | 0 | X | 0 | X | No Reads |
| PR2 | 0 | X | X | 1 | Read from BQ2 |
| PR2 | 0 | X | X | 0 | No Reads |
| PR1 & PR2 | 0 | X | 0 | 0 | No Reads |
| PR1 & PR2 | 0 | X | 1 | 0 | Read from BQ1 |
| PR1 & PR2 | 0 | X | 0 | 1 | Read from BQ2 |
| PR1 & PR2 | 0 | PR1 | 1 | 1 | Read from BQ2 |
| PR1 & PR2 | 0 | PR2 | 1 | 1 | Read from BQ1 |

As Table 1 shows, two channels may each assert pixel requests (PR1 and PR2 respectively) to the pixel request arbiter 817. If only one channel asserts a request, and that channel's block queue is ready (e.g., contains data), that channel's request may be serviced. If both channels request data at the same time, but only one channel has data available in the pixel buffer (i.e., that channel's block queue), that channel's request may be serviced. If both channels request data and have data available, whichever channel's request was serviced least recently may be serviced.

In the illustrated embodiment, the display output queues 821 are responsible for asserting each channel's pixel request. For example, in one embodiment, each display output queue 821 may assert a pixel request when the queue 821 falls below half full. In another embodiment, each display output queue 821 may begin requesting data when it falls below entirely full. Many other threshold levels are possible. In many embodiments, it may be desirable to set the threshold level such that pixel requests are asserted at a point that ensures that the channel will have enough data available when needed. Thus, the threshold level may take into account the maximum latency of the retail loop. This latency may include all or some of the following: the time for an output queue 821 to assert a request to the pixel request arbiter 817, time for the pixel request arbiter 817 to select and forward a request, additional time to account for instances when both channels are requesting pixels at the same time and the other channel's request is serviced first, time for the pixel data to be read from the channel's block queue in the pixel buffer 815, time for the pixel data to pass through the pixel processing pipeline 194, and/or time to load the display output queue 821.

Once a request is forwarded to the pixel buffer 815, the pixel buffer 815 may output one or more pixels in response to receiving the request. For example, in one embodiment, the pixel buffer 815 may output a pair of pixels in response to each received request. Upon leaving the pixel buffer 815, the pixels may undergo additional processing in some embodiments. For example, the pixels may be processed using a window lookup table (WLUT), a gamma correction lookup table (GLUT), and/or indexed color maps (CLUTS) 194. In many embodiments, the pixels may also be processed according to the current cursor location (e.g., if the pixel address matches the current cursor location, the pixel may be replaced with a portion of a cursor bitmap). In general, this additional processing is described as the pixel processing pipeline 194.

After undergoing the additional processing, if any, the pixels may be written into the requesting channel's display output queue (DOQ) 821. Each channel may have its own display output queue 821, so at this point in the output pipeline, the channels may no longer be sharing resources. Pixels may then be read out of the display output queue 821 and sent to the corresponding display using the consumer loops for each channel. For example, in one embodiment, pixels may be read from each display output queue 821 at a rate of one pair of pixels per two pixel clock cycles so that the display receives one pixel per cycle while allowing the display output queue 821 to operate at half the pixel rate. If the display is a CRT, pixels read out of the display output queue 821 may be processed by a DAC such as the one shown in FIG. 3 before being output to the display. Similarly, if the display is a NTSC display device the pixels may be passed through a video encoder before being output to the display. In general, many different types of displays may be used with the system shown in FIG. 8. For example, the display may be a CRT, an LCD, a gas plasma display, a NTSC or PAL device with encoded television video, a digital micro-mirror display, a projection display, or any other suitable display device or group of display devices.

Figure 9:
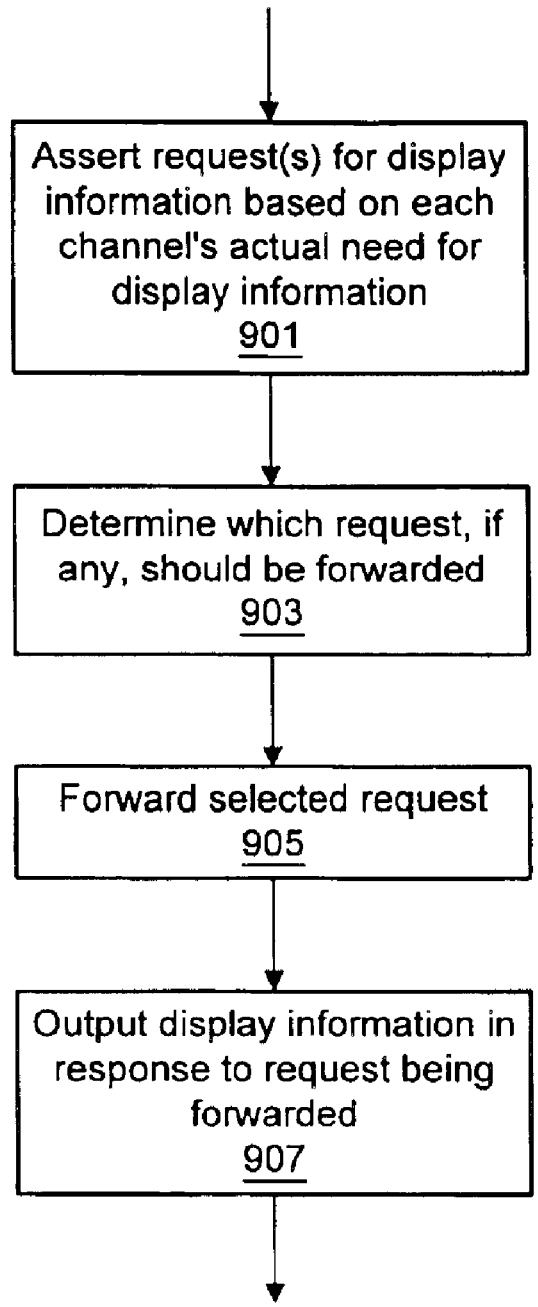
FIG. 9 shows one embodiment of a method of sharing an output pipeline between two display channels.

FIG. 9 shows one embodiment of a method of sharing a display information output pipeline between multiple display data streams. At 901, requests for display information are asserted by one or more channels based on the requesting channel(s)' actual needs. These requests may be for display information in a frame buffer or pixel buffer. Thus, in one embodiment, a channel may begin asserting requests when that channel is about to end a vertical blanking interval and continue asserting requests until that channel's next vertical blanking interval is about to begin. In another embodiment, the channel may begin asserting requests when the level of a display information queue for that channel drops below a certain threshold. For example, the channel may assert a request if the level of its display output queue drops below half full.

At 903, a determination is made as to which, if any, of the requests should be forwarded. For example, in one embodiment, the requests may be arbitrated based on the level of data in each channel's display information queue (see FIG. 10A). Alternatively, the channel's requests may be arbitrated based on which channel's request was serviced last and which channel has display information available (see FIG. 10B).

The selected request is then forwarded, as indicated at 905, to the device (e.g., a frame buffer or pixel buffer), and in response, the device outputs display information to the requesting display channel, as shown at 907.

Figure 10A:
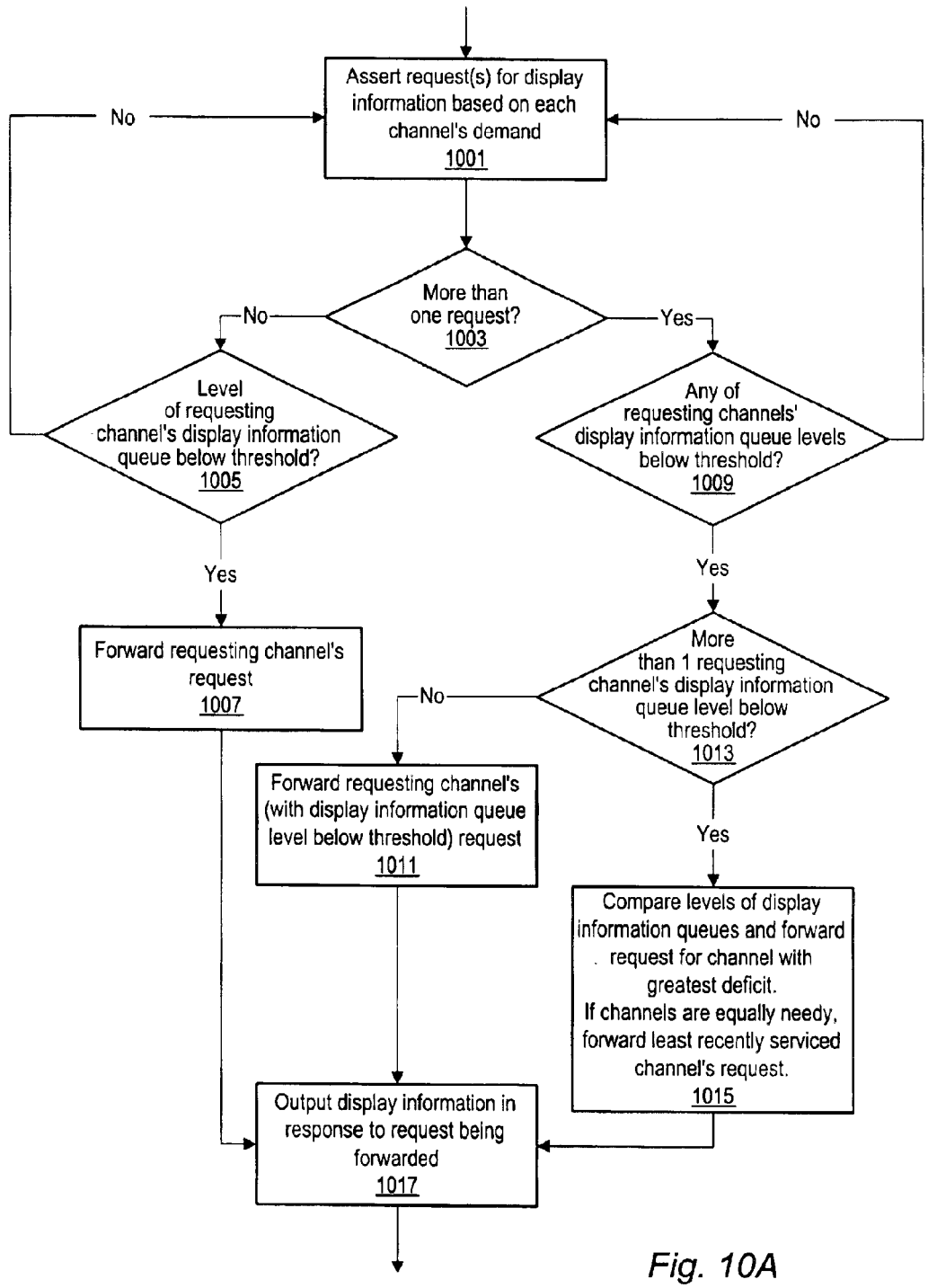
FIG. 10A shows another embodiment of a method of sharing an output pipeline between two display channels.

FIG. 10A shows another embodiment of a method of sharing a display information output pipeline between multiple display data streams. This method may correspond to the method used by an arbiter such as arbiter 805 in FIG. 8. In this embodiment, one or more of the display channels may assert requests based on their actual demand, at 1001. If only one request is issued, the level of the requesting channel's display information queue (e.g., pixel block queue or display output queue) may be compared to a threshold level, and if the level is below the threshold, the request may be forwarded. This threshold level may be selected to ensure that each channel receives display information as it is needed, despite latencies in the output pipeline. If the level is not below the threshold, the request may not be forwarded.

If more than one request is asserted, as indicated at 1003 and 1009, the levels of the requesting channels' display information queues (e.g., block or pixel queues or display output queues) may be compared to the threshold level (although in some embodiments, different channels may have different threshold levels). If none of the requesting channels' display information queues' levels are below the threshold(s), none of the requests may be forwarded, at 1009. If only one requesting channel's level is below the threshold, that channel's request may be forwarded, as indicated at 1011. If several requesting channels' levels are below the threshold, the channels' deficits (the magnitude of the difference between each channel's display information queue's actual level and the threshold level) are compared, and the request from the channel with the greatest deficit may be forwarded, as shown at 1015. In response to a request being forwarded, the device from which display information is requested (e.g., a frame or pixel buffer) outputs information to the requesting channel.

Figure 10B:
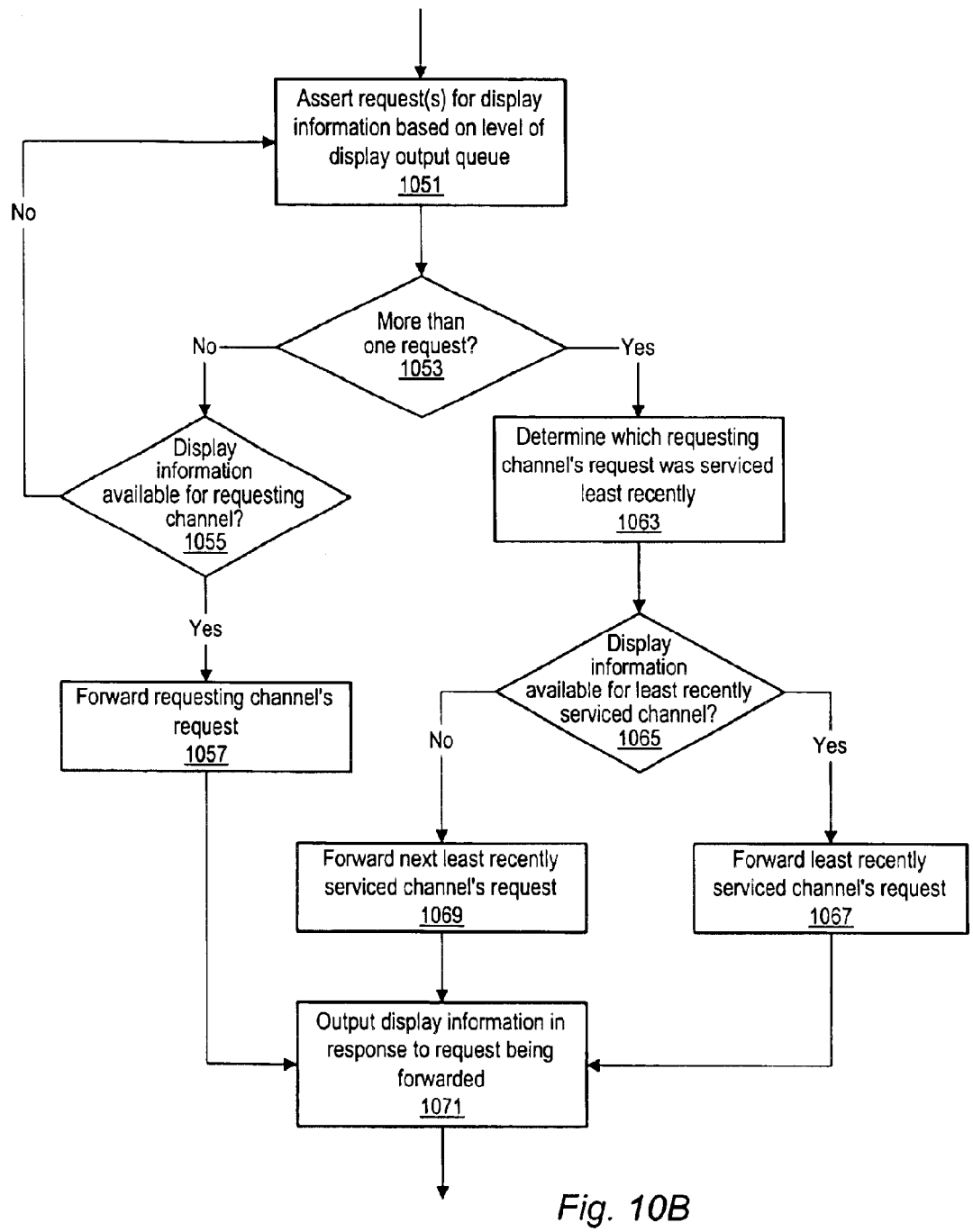
FIG. 10B shows another embodiment of a method of sharing an output pipeline between two display channels.

FIG. 10B shows an alternative embodiment of a method of sharing a display information output pipeline between multiple channels. This method may correspond to the method used by an arbiter such as arbiter 817 in FIG. 8. In this embodiment, one or more of the display channels may assert requests for display information, at 1051. If only one request is asserted, a determination is made as to whether there is any display information available for the requesting channel, as indicated at 1055. At 1057, if display information is available, the requesting channel's request may be forwarded.

If more than one channel asserted a request, the least recently serviced channel is determined, at 1063, and if display information is available for that channel, the least recently serviced channel's request may be forwarded, at 1067. If display information is not available for the least recently serviced channel, the next least recently serviced channel's request may be forwarded instead, as shown at 1069.

Once a request is forwarded to a device (e.g., a frame or pixel buffer), the receiving device may output display information to the requesting channel, at 1071.

Video Controller Bandwidth

Looking back at FIG. 8, one problem that may arise when sharing the frame buffer 22 is that in certain situations, a great deal of bandwidth may be sacrificed when switching between each channel's display information requests. For example, this loss of bandwidth may arise due to various setup procedures that are used to switch between channels when accessing display information within the frame buffer 22.

Figure 11A:
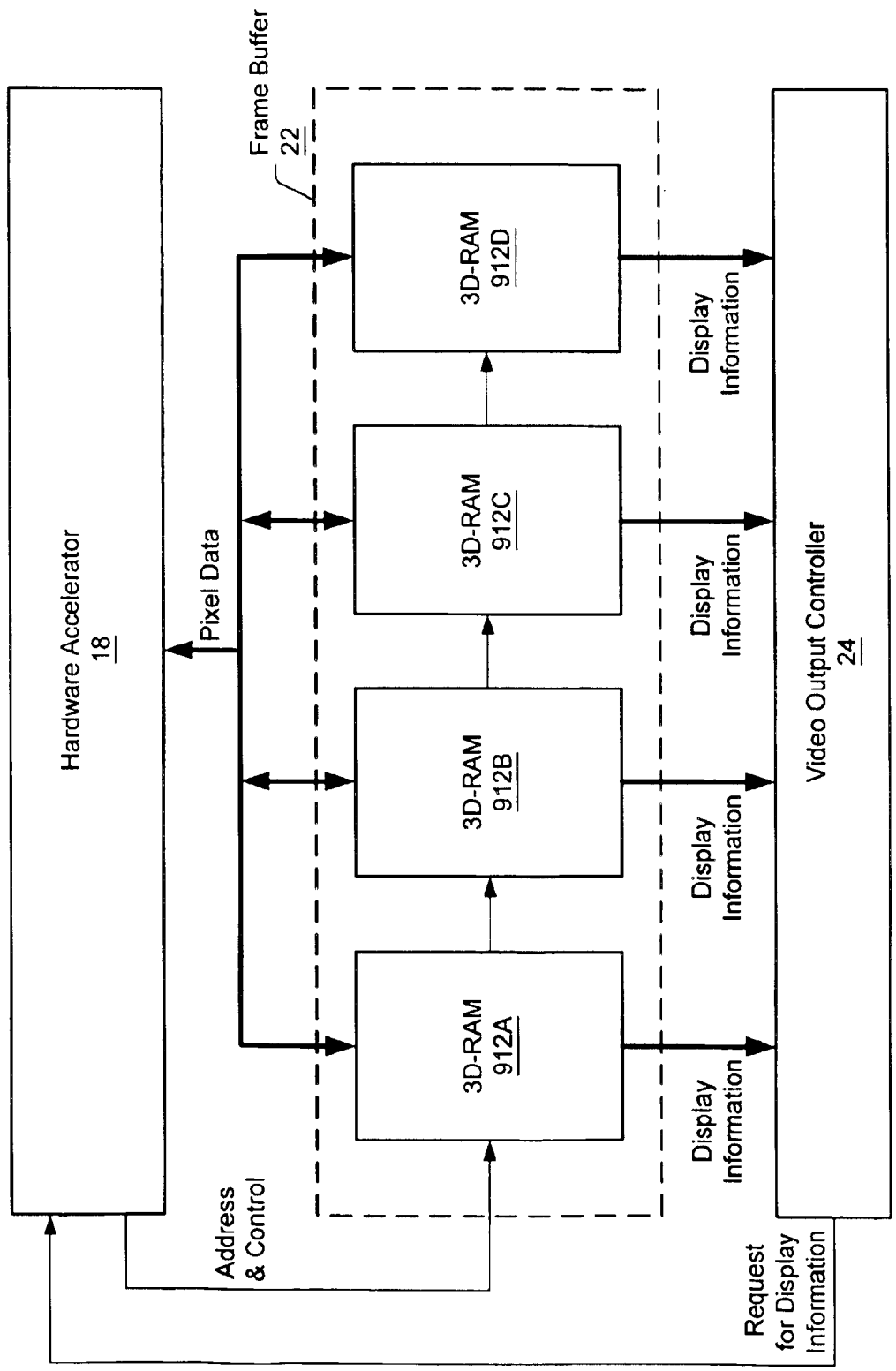
FIG. 11A shows one embodiment of a frame buffer.

In some embodiments, the frame buffer may include several 3D-RAMs such as those manufactured by Mitsubishi. FIG. 11A shows one example of such an embodiment of a frame buffer 22. In this embodiment, the frame buffer 22 includes four 3D-RAMs 912. Note that other embodiments may include more than or fewer than four 3D-RAMs.

FIG. 11B shows one embodiment of an individual 3D-RAM 912. 3D-RAM 912 includes four independent banks of DRAM 914. Display information may be read from the DRAM banks 914 into the internal pixel buffer 930 (pixel buffer 930 is internal to the 3D-RAM 912 and should not be confused with pixel buffer 815 in FIG. 8). The internal ALU (arithmetic logic unit) 924 may modify data stored in the pixel buffer. While data is being modified, additional data may be written to the pixel buffer 930. Since the 3D-RAM allows pixel data to be modified as it is being read from the pixel buffer (i.e., without having to output the data off-chip), operations such as Z-buffer and pixel blend operations may be more efficiently performed. For example, instead of such operations being performed as "read-modify-writes," these operations may be more efficiently performed as "mostly writes."

When providing bursts of display information to the video output controller, the odd banks of DRAM output display information to a first SAM video buffer 916A while the even banks output display information to a second SAM video buffer 916B. Each video buffer 916 may be loaded in a single operation. Because of this configuration, display information may be read from the first SAM 916A while display information is being written to the second SAM 916B and vice versa. Since one SAM may be loaded while the other is outputting display information, the 3D-RAM 912 may be able to output relatively continuous bursts of display information if successive display information requests alternately target even and odd banks within the 3D-RAM 912.

The even (SAM II 916B) and odd (SAM 1916A) SAMs correspond to the even and odd DRAM banks 914. Normally, the frame buffer 22 may achieve an optimal output bandwidth when display information is read out by alternating between even and odd banks. For example, if display information is requested from Bank 1, then Bank 2, then Bank 3, and then Bank 4, display information from Bank 1 may be loaded into the "odd" SAM that buffers data from Banks 1 and 3. Then, the requested data from Bank 1 may be read out of the odd SAM while data from Bank 2 is being written into the "even" SAM. After the read from the odd SAM, the data from Bank 2 may be read out of the even SAM as the requested data in Bank 3 is written into the odd SAM. By alternating between even and odd banks, the frame buffer is able to maintain maximum bandwidth since each SAM may be refilled while the other SAM is providing a burst of data. If the requests are received in time for one SAM to fill with data while data is being drained from the other SAM, near-continuous bursts may be provided. For example, if it takes 8 frame buffer cycles to fill a SAM and 40 frame buffer cycles to provide a burst of data to the video output controller from a SAM, the 8 fill cycles for one SAM may be "hidden" within the 40 output cycles of the other.

Since the 3D-RAMs in the frame buffer may be interleaved, satisfying a burst request may involve receiving a burst from each 3D-RAM. For example, returning to FIG. 11A, if one of the SAM's in each of the 3D-RAMs is capable of storing 20 pixels, bursts of 4*20 pixels (20 pixels from each 3D-RAM 916) may be provided by the frame buffer 22. If the requesting display is a 1280×1024 CRT, 16 bursts of 80 pixels each may provide the 1280 pixels needed for each scan line.

In order to benefit from the ability of each 3D-RAM to hide the fill cycles of one SAM in the read cycles of the other, display information in the frame buffer may be stored so that successive burst requests for data in a display channel alternate between targeting even and odd banks in each 3D-RAM. For example, a first request for a burst of display information may target bank 1 in each of the 3D-RAMs 912. The next request may target bank 2 in each 3D-RAM 912. If display information is not arranged this way in the frame buffer, two successive even (or odd) requests may occur. As a result, it may no longer be possible to hide the fill cycles. For example, if two consecutive requests target the same pair of banks, the video buffer may not be refilled to provide the second burst during the cycles it is outputting the first burst. Instead, the video buffer may completely output the first burst before it begins refilling with the second burst. As a result, this second burst of display information may take more cycles to provide. As this shows, successive requests to the even or odd banks lower the effective bandwidth since no display information may be provided from the frame buffer during the frame buffer cycles that the SAMs are refilling.

When data for more than a single display channel is stored in the frame buffer, situations may arise where the combined request stream for the various channels presents successive requests to the even (or the odd) banks in the 3D-RAMs. For example, assume each channel requests data by alternating requests for data from an even bank and then an odd bank of each 3D-RAM in the frame buffer. As a result, each channel, when considered individually, efficiently requests data from the frame buffer. The notation 'E' or 'e' represents a request for data from an even bank, and 'O' or 'o' represents a request for data from an odd bank. Channel A's request stream is represented by uppercase letters and Channel B's request stream is represented by lowercase letters. Channel A's request stream may be: EOEOEOEOEO. Similarly, channel B's request stream may be: eoeoeoeoeo. If channel A is three times faster than channel B, a need-based arbiter (as shown in FIG. 8) may forward their requests in the order: EOEeOEOoEOEeOEOo. As described above, whenever two even (or two odd) requests appear in a row, the frame buffer may be unable to process the requests as quickly as it could process alternating even-odd requests. Instead, the frame buffer may have to wait for one of the SAMs to drain completely before it can begin satisfying the repeated even (or odd) request. Thus, using an 'X' to represent points at which inefficient accesses occur, the frame buffer's response to the request stream EOEeOEOoEOEeOEOo may be EOE X eOEO X oEOE X eOEO X o.

This example may be generalized to the situation where the arbiter forwards one request from channel A for every N requests from channel B (e.g., because channel B is N times faster than channel A). Since bandwidth reduction may occur once every N+1 requests, less bandwidth may be lost when switching between the channels' requests as N increases. Conversely, as N decreases, the bandwidth loss may become more significant. For example, if the two channels are requesting data at approximately the same rate, the resulting request stream forwarded by the need-based arbiter may be: EeOoEeOoEeOo. In this situation, bandwidth reduction may occur as often as every two requests.

In order to minimize the bandwidth lost when switching channels, the arbiter 805 may be configured to arbitrate between the request streams so that the requests the arbiter sends to the frame buffer 22 alternate between even and odd requests more consistently. If the individual request streams each alternate between even and odd requests, one way to increase the bandwidth is to forward a certain number of consecutive requests from one channel before forwarding to any other channel's requests. For example, in one embodiment, the arbiter 805 may have a "lockstep" mode where the arbiter forwards at least two consecutive requests (even followed by odd or odd followed by even) from one channel before forwarding another channel's requests. For example, if the arbiter 805 is configured to determine which channel is neediest based on the number of valid blocks in the channels' block queues, the next "neediness" comparison may not be performed until after two consecutive requests have been forwarded from the current neediest channel.

By using a lockstep mode, the arbiter may prevent the extreme bandwidth loss that may occur for small values of N. For example, if N=1, a lockstep arbiter may forward the request stream EOeoEOeoEOeo (instead of the request stream EeOoEeOoEeOo, which would be forwarded by a non-lockstep arbiter). Thus, by rearranging the forwarded request stream to alternate between even and odd requests, a lockstep arbiter may decrease the loss bandwidth for the two request streams. As a result, lockstep mode may reduce the inefficiencies caused by sharing the frame buffer between multiple display channels.

Since the channels are prefetching, using a lockstep mode may not cause any channel to 'starve' for data as long as the channels' requesters take into account the additional delay that may result from the lockstep mechanism. Thus, each request may be configured to prefetch data far enough in advance to account for the delay that occurs when a request in the wholesale loop has to wait for two consecutive requests from another channel to be serviced.

Thus, returning to the above example where channel A was three times faster than channel B, the request stream EOEeOEOoEOEeOEOo discussed above may be received by the request arbiter. If the arbiter is in lockstep mode, the arbiter may forward the request stream EOEOeoEOEOEOeoEO to the frame buffer. By restructuring the requests this way, inefficiencies in reading data from the frame buffer may be reduced.

In some embodiments, the arbiter may be configured to enter lockstep mode only when the channels' data rates are so similar that the rate at which data is output from the frame buffer is significantly affected. Thus, when the channels have relatively diverse data rates, the effect of occasional conflicts on the frame buffer's performance may be negligible, and the arbiter may not enter lockstep mode. When the data rates are more similar, and thus conflicts may occur more frequently and have a more pronounced effect on bandwidth, the arbiter may enter lockstep mode.

In one embodiment, an arbiter configured to operate in lockstep mode may perform better when the channels' displays have the same resolution and/or when the channels have the same pixel clock rate and number of bursts per line. In such an embodiment, it may also improve performance if the channels' timing generators begin at the same time.

While the examples above refer to embodiments that include 3D-RAM devices, similar concerns about reductions in bandwidth may arise in many other situations as well. Generally, whenever repeated access to the same memory device or portion of a memory device (e.g., a bank, interleave, etc.) causes a reduction in performance, it may be desirable to implement a lockstep mode or otherwise limit the number of consecutive accesses to the same device or portion of a device.

Figure 12A:
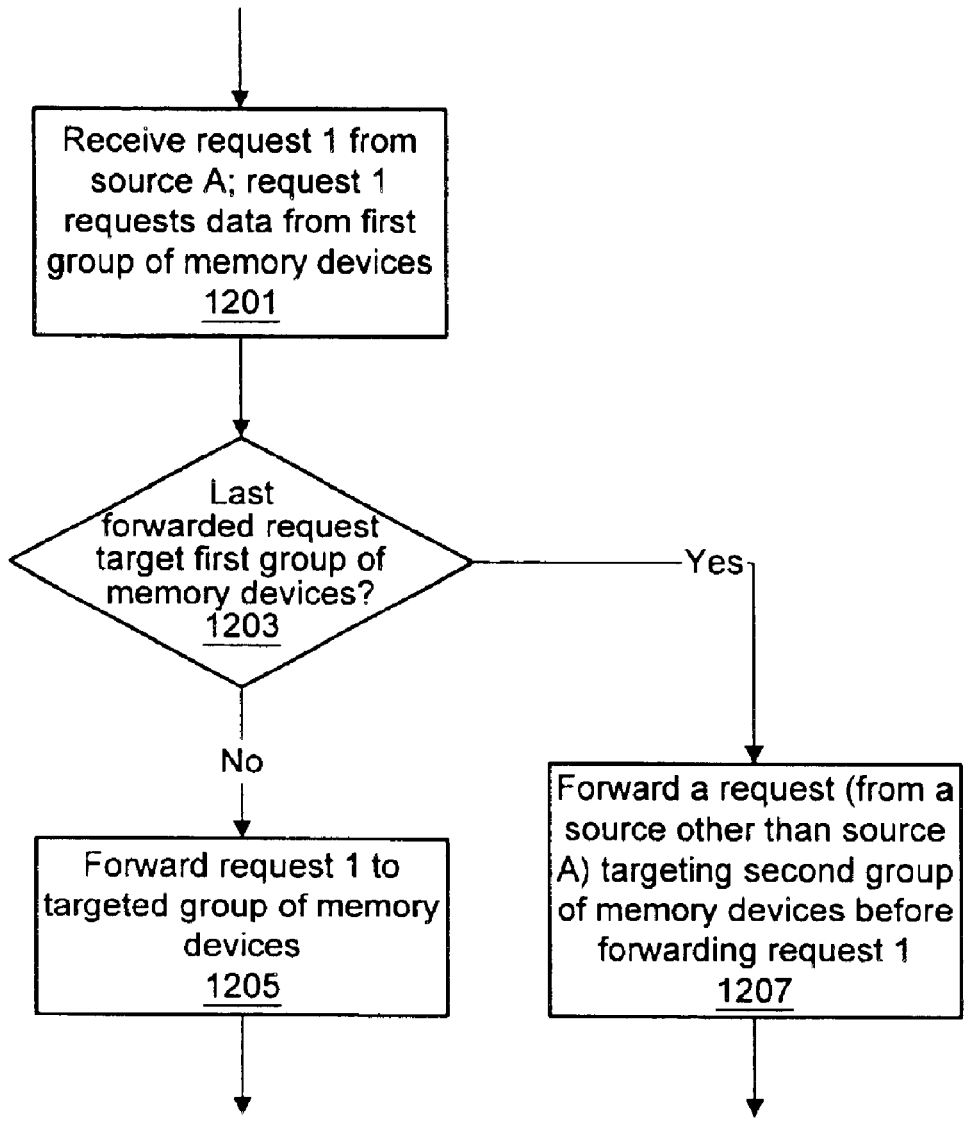
FIG. 12A shows one embodiment of a method of arbitrating between two request streams in a way that reduces inefficiencies.

FIG. 12A shows one embodiment of a method of arbitrating between multiple sources' requests to access data in multiple memory devices (e.g., memories, memory banks, serial access memories, buffers, etc.). Generally, this method may reduce inefficiencies that arise whenever consecutive requests access the same memory device. The arbitrating may be performed so that consecutive requests forwarded to the multiple memory devices tend to access different memory devices more often than they would if they were arbitrated based on each source's relative need for the data or if they were not arbitrated at all.

In step 1201, request 1 is received from source A. Request 1 requests data from a first group of the multiple memory devices. The first group may be a single memory device. For example, the multiple memory devices may be serial access memories included in a frame buffer, and request 1 may request display information that will be output from a first serial access memory. If the last forwarded request targeted a group other than the first group, then request 1 may be forwarded, as shown at 1203–1205. If instead the last request forwarded to the multiple memory devices also targeted the first group of memory devices, then another source's request that targets a group other than the first group may be forwarded before request 1 is forwarded, as shown at 1203–1207. This way, consecutive requests tend not to access the same group of memory devices, and any performance decreases that may occur due to consecutive accesses to the same group of devices may be avoided.

One exception to the arbitration method shown in FIG. 12 may arise if the last forwarded request targeted the first group of memory devices and all of the pending requests target the first group. In this case, since all of the requests will cause a consecutive access to the first group, any one of the requests may be forwarded (e.g., based on a need-based arbitration).

Figure 12B:
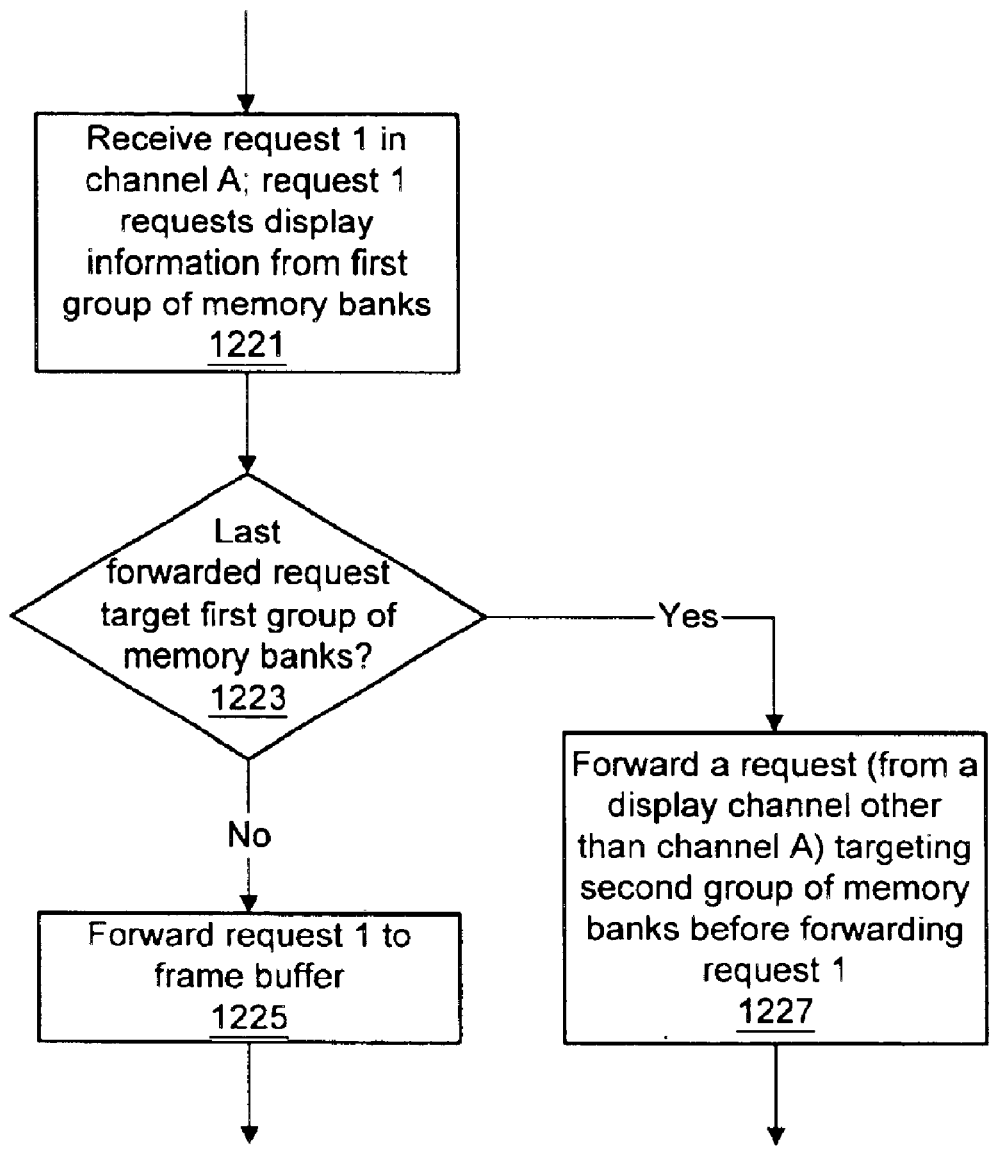
FIG. 12B shows one embodiment of a method of arbitrating between two request streams in a way that reduces frame buffer inefficiency.

FIG. 12B shows another embodiment of a method of arbitrating between multiple display channels' requests for display information from a frame buffer. The frame buffer may output data more efficiently when successive requests sent to the frame buffer alternate between requests for data from a first group of memory banks (e.g., a pair of banks which output data to a first serial access memory (SAM)) and a second group of memory banks (e.g., a pair of banks which output data to a second SAM). To take advantage of the frame buffer's higher efficiency when presented with alternating requests, this method may involve arbitrating between multiple display channels' request streams. The arbitrating may be performed such that requests received by the frame buffer alternate between requests for display information from the first group and requests for display information from the second group. Preferably, the requests will alternate more often than they would if they are arbitrated based solely on each display channel's relative neediness.

For simplicity, this method is illustrated with reference to a first display channel, channel A, and one or more other channels. In step 1221, a first request targeting group 1 is received from channel A. If the last request that was forwarded to the frame buffer targeted group 2, then the first request may be forwarded to the frame buffer, as shown at 1225. In contrast, if the last request targeted group 1, then request 1 may not be forwarded until after a request in a different channel that targets group 2 is forwarded, as shown at 1227. One exception may occur if all of the display channels' requests target group 1. In this case, all of the requests are inefficient (i.e., involve a consecutive access to the same group of memory banks), so any one of the requests may be forwarded. For example, an arbiter may be configured to select the neediest request (e.g., the channel that has been least recently serviced or that has the lowest level of data in a queue) if all of the pending requests target group 1.

Note that in some embodiments, the requests themselves, as presented to the arbiter, may not indicate which group of memory banks they target. Instead, this information may be maintained by each display channel's address generator, which keeps track of the address in the frame buffer from which the next burst of display information should be provided for its display channel. In some embodiments, this address information may not be available to the arbiter. Instead, the arbiter may know which channel a particular request corresponds to (e.g., based on a tag in the request or based on which of the arbiter's inputs received the request). If requests in each channel conform to a particular order (e.g., they each begin requesting from the same group (even or odd) of banks and they each alternate between groups in the same pattern), then the arbiter may be configured to arbitrate between requests based on which channel they belong in.

Figure 12C:
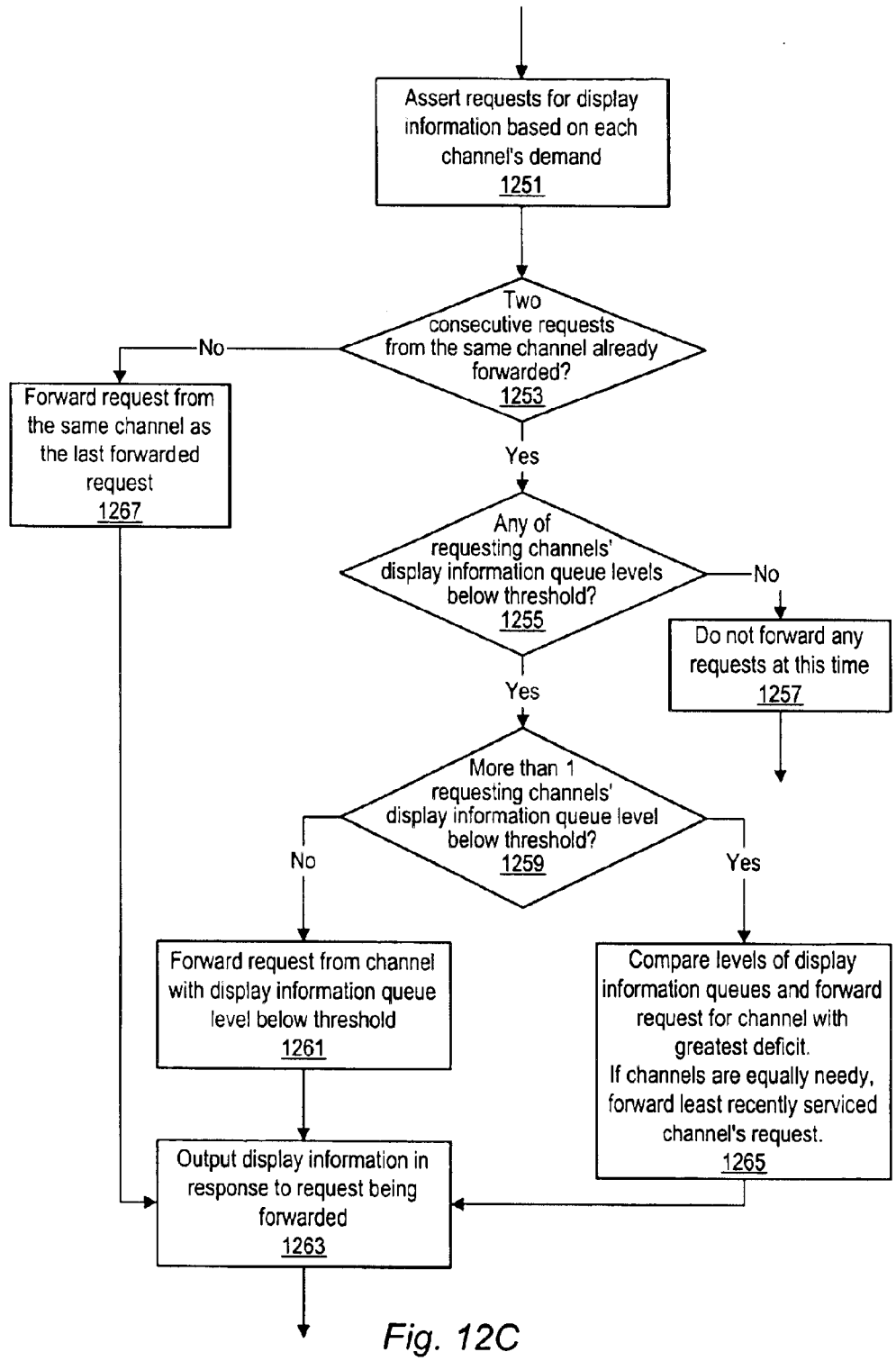
FIG. 12C shows another embodiment of a method of arbitrating between two request streams in a way that reduces frame buffer inefficiency.

FIG. 12C shows another embodiment of a method for arbitrating between requests for display information based on which channel asserted each request and the relative neediness of the asserting channel(s). Each channel may assert requests that alternate between requests for display information from one group of memory banks and requests for display information from another group of memory banks in order to increase the efficiency with which each channel's requests may be serviced (e.g., alternating between which SAM the display information will be provided from if 3D-RAMs are being used). In this embodiment, requests for display information may be asserted for each display channel based on each channel's demand for display information. For example, a channel's requests for display information may be asserted while the channel is in a non-blanking period.

In order to determine which of the asserted requests to forward to the frame buffer, a determination is made as to whether two consecutive requests have already been forwarded from the same channel (at 1253). If two consecutive requests have been forwarded, the relative neediness of the display channels that have asserted requests is determined. For example, the level of display information in each requesting channels' display information queue may be compared to a threshold level. Based on the outcome of the neediness determination, a request may be forwarded to the frame buffer, as discussed with respect to FIG. 10A.

In contrast, if two consecutive requests have not yet been forwarded to the frame buffer, the neediness determination may not be made. Instead, a second request from the channel whose request was last forwarded may be forwarded to the frame buffer, as shown at 1267. This way, the requests forwarded to the frame buffer may alternate between requests for display information from each of the two groups of memory banks, increasing the efficiency with which the display channels are provided display information. Note that in this embodiment, better performance may be achieved if the display channels each request the same number of bursts each line.

Frame Buffer Organization and Pixel Reordering

Generally, frame buffers may be organized in a way that allows more efficient rendering of data into the frame buffer. Thus, looking back at FIG. 3, the frame buffer 22 may be configured so that the hardware accelerator 18 may more efficiently read and/or write rendered data into the frame buffer 22.

One consequence of organizing a frame buffer for the benefits of the rendering components' accesses is that the organization may complicate the way that display information is provided to the output processor. For example, the output processor may receive display information that is out of order with respect to the order in which it should be provided to a display device for display. As a result, the output processor may be configured to reorder the display information it receives from the frame buffer before passing the data to the display device(s).

In some embodiments, the output processor may include logic to reorder the display information that is output from the frame buffer into the proper order for outputting to a display device. In one embodiment, the reordering logic may be interposed between the frame buffer and a pixel buffer.

Several different reordering methods may be implemented using the reordering logic. For example, if data is provided from the frame buffers in bursts, the pixel buffer may be partitioned so that at least one block large enough to store a complete burst is allocated to each display channel. As a burst is received, the pixels within that burst may be reordered and placed in display order within the block that is dedicated to the display channel that requested the burst.

The pixels may then be read out of the block that corresponds to the requesting display channel in the order that they are stored. Since the blocks are in order and the pixels within each block are in order, the pixels may be read out in display order.

In one embodiment, the frame buffer may include multiple 3D-RAMs. Each interleave may provide 20 pixels each burst. Thus, if the frame buffer includes eight 3D-RAMs, there may be 160 pixels in a burst. If pixels are provided at the rate of 1 pixel per transaction per interleave, it may take 20 transactions to receive a full burst from the frame buffer. Within each transaction, eight pixels may be received.

The display order of the pixels may be determined based on how the hardware accelerator renders data into the frame buffer. While each frame buffer and/or hardware accelerator configuration may store the pixels in a different order, in many embodiments the proper display order may be expressed as a formula in terms of the order in which the pixels are received from the frame buffer and the location in the frame buffer which was storing the pixels. Since these parameters may be available to the output processor, the output processor may be configured to reorder the pixels output by the frame buffer into the proper display order.

For example, in one embodiment, the display order of the pixels may be determined as each pixel is received, based on the transaction in which it is received, the address it is stored at, and the interleave that it is stored in, as shown in Table 2. N equals the transaction number (0 through 19, assuming that 20 transactions provide a full burst). The display order Z of a given pixel is determined by the formula:

$$Z(N)=(16*(N/4))+(2*(N\%4)) \quad (1)$$

where "/" indicates integer division and "%" indicates integer modulus.

TABLE 2

| | Pixel order. | | | |
|---|---|---|---|---|
| Interleave | 4 Interleaves (even line) | 4 Interleaves (odd line) | 8 Interleaves (even line) | 8 Interleaves (odd line) |
| 0 | 2N | 2N + 40 | Z(N) | Z(N) + 80 |
| 1 | 2N + 1 | 2N + 41 | Z(N) + 1 | Z(N) + 81 |
| 2 | 2N + 40 | 2N | Z(N) + 8 | Z(N) + 88 |
| 3 | 2N + 41 | 2N + 1 | Z(N) + 9 | Z(N) + 89 |
| 4 | N/A | N/A | Z(N) + 80 | Z(N) |
| 5 | N/A | N/A | Z(N) + 81 | Z(N) + 1 |
| 6 | N/A | N/A | Z(N) + 88 | Z(N) + 8 |
| 7 | N/A | N/A | Z(N) + 89 | Z(N) + 9 |

Thus, for an evenly addressed line in a four-interleave configuration, the 80 pixels in a burst are provided from the frame buffer in the order 0, 1, 40, 41 (transaction 0); 2, 3, 42, 43 (transaction 1); 4, 5, 44, 45 (transaction 2); . . . 38, 39, 78, 79 (transaction 19). In the case of an odd line, interleaves 0 and 1 (or 0, 1, 2, 3 if there are 8 interleaves) are swapped with interleaves 4 and 5 (or 4, 5, 6, and 7 for 8 interleaves), so the pixels would be provided in the order 40, 41, 0, 1 and so on from a frame buffer with four interleaves. Thus, based on which transaction a pixel is received in, which interleave a pixel is received from, and whether the pixel was stored at an even or odd address in the frame buffer, the display order of the pixel may be determined. Note that these formulas are merely exemplary—other frame buffer/hardware accelerator configurations may store pixels in orders that may be described by different formulas.

Figure 13:
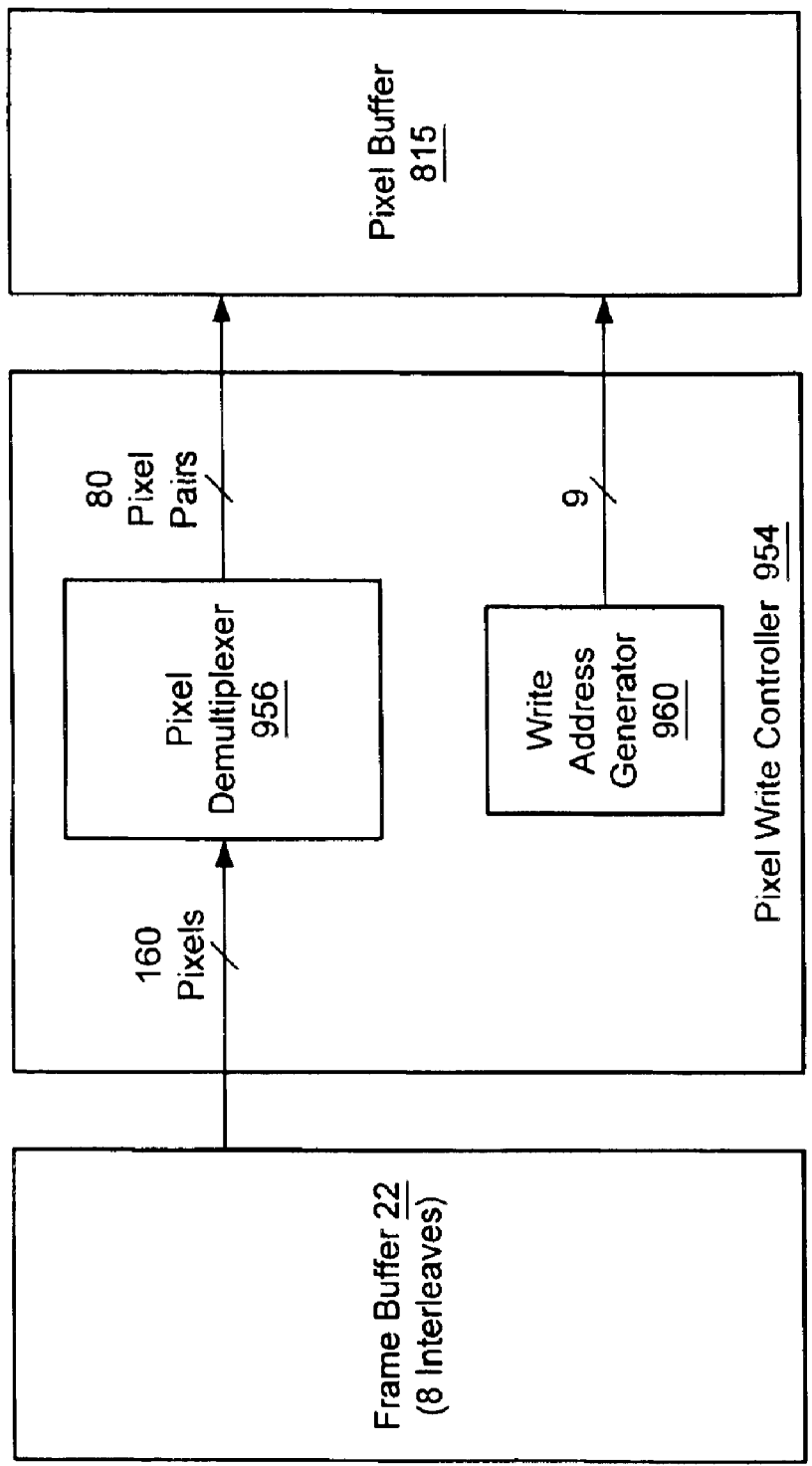
FIG. 13 illustrates one embodiment of a pixel write controller.

FIG. 13 shows one embodiment of a pixel write controller 954. The pixel write controller 954 is configured to demultiplex the 160 pixels output from a frame buffer 22 into 80 pixels pairs. These pixel pairs may then be stored into the portion of the pixel buffer 815 that corresponds to the display channel which requested the current burst. In order to store the pixels in the proper display order within the block in the pixel buffer 815, each display channel may have an associated write address generator 960.

Figure 14:
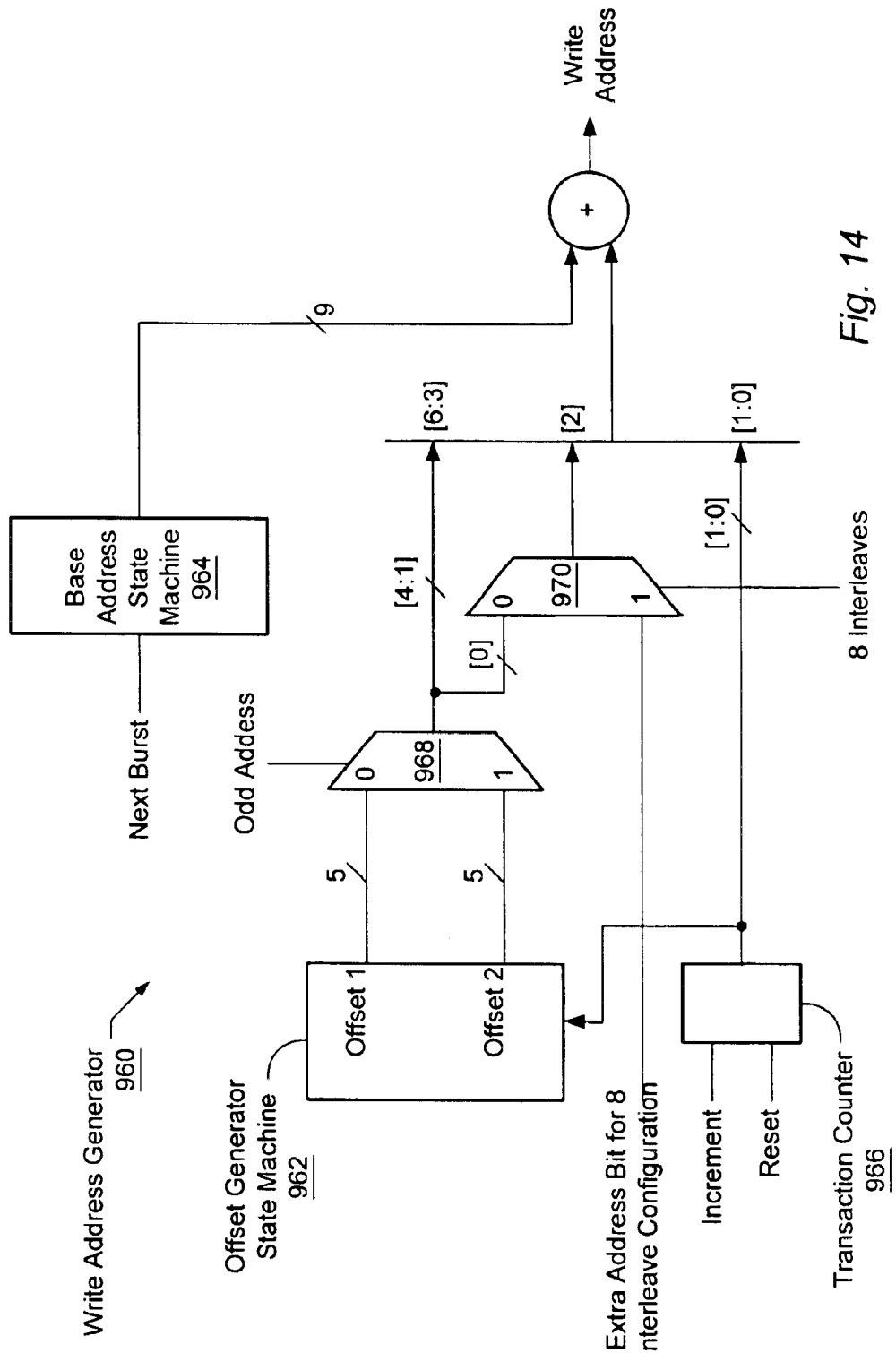
FIG. 14 shows one embodiment of a write address generator.

FIG. 14 shows one embodiment of a write address generator 960. The write address generator 960 may calculate an address within the pixel buffer 815 for each pixel as it is received from the frame buffer 22. In this embodiment, the pixel buffer 815 may be divided into blocks of 160 pixels (for an eight-interleave frame buffer configuration). Accordingly, in one embodiment, an entire burst of pixels may fit into a single block, which may fill up after 20 transactions. Each block may be configured to store pixels as pairs of pixels, so a 160-pixel block may store 80 pixel pairs. If each pixel is 40 bits, each pixel pair may be stored together as part of a single 80-bit line in the pixel buffer.

The write address generator 960 generates an address within the block that is currently being filled for each pixel pair. Thus, the output of the write address generator 960 is the pixel buffer write address. It is generated by adding the base address of the current block to an offset within that block.

The base address of the current block may be generated by a base address state machine 964. The base address state machine 964 may be configured to cycle through available base addresses within the pixel buffer 815. For example, if the portion of the pixel buffer that is dedicated to a first display channel is configured to store 480 pixel pairs (960 pixels), the base address state machine 964 may be configured to cycle through the base addresses in the order shown in Table 3. Note that Table 3 shows values for both four- and eight-interleave embodiments.

TABLE 3

Base Address State Machine.

| Base Address | Next (4 Interleaves) | Next (8 Interleaves) |
|---|---|---|
| 0 | 40 | 80 |
| 40 | 80 | N/A |
| 80 | 120 | 160 |
| 120 | 160 | N/A |
| 160 | 200 | 240 |
| 200 | 240 | N/A |
| 240 | 280 | 320 |
| 280 | 320 | N/A |
| 320 | 360 | 400 |
| 360 | 400 | N/A |
| 400 | 440 | 0 |
| 440 | 0 | N/A |

As Table 3 shows, in this embodiment, successive base addresses may be incremented by 40 (corresponding to the 40 pixel pairs in each block) if there are four 3D-RAMs and by 80 if there are eight 3D-RAMs. The state machine may cycle to the next base address each time a complete burst has been stored in the pixel buffer. For example, the base address state machine 964 may be configured to change state whenever the frame buffer acknowledges receipt of a burst request. Once the final block (from 440–479 or 400–479 for the four and eight interleave configurations respectively) in the pixel buffer has been filled, the base address state machine may cycle back to address 0, so that the next burst fills the first block in the pixel buffer.

The offset address may be calculated by concatenating an offset (generated by the offset generator state machine 962) with the output from a transaction counter 966. The transaction counter 966 may count the number of cycles it takes to complete a transaction. For example, if it takes four cycles to complete each transaction, the transaction counter 966 may count from 0 to 3. Once the transaction counter 966 reaches 3, it may be configured to reset and continue counting from 0 again, assuming that the final transaction has yet to be completed.

The offset generator state machine 962 may generate bits 6:3 of the offset address based on the current state of the offset state machine 962. The offset state machine 962 may be configured to change state after every transaction (e.g., when the transaction counter 966 reaches 3). In each state, the offset generator state machine 962 may output two offsets, as shown in Table 4. Based on whether the current pixel pair was received from an even or an odd addressed line in the frame buffer 22, a multiplexer 968 selects the correct offset for the current pixel pair. Note that the offset may be 7 bits in the 4 interleave case but only 6 bits when there are 8 interleaves. This seventh bit may be referred to as control bit "X."

TABLE 4

Offset Generator State Machine.

| | 4 Interleaves | | 8 Interleaves | |
|---|---|---|---|---|
| State | Offset 1 - Even Address | Offset 2 - Odd Address | Offset 1 - Even Address | Offset 2 - Odd Address |
| 0 | 00000 (0) | 00101 (20) | 00000 (0) | 01010 (40) |
| 1 | 00001 (4) | 00110 (24) | 00010 (8) | 01100 (48) |
| 2 | 00010 (8) | 00111 (28) | 00100 (16) | 01110 (56) |
| 3 | 00011 (12) | 01000 (32) | 00110 (24) | 10000 (64) |
| 4 | 00100 (16) | 01001 (36) | 01000 (36) | 10010 (72) |

Thus, for each transaction the addresses for two (or four, if there are eight interleaves instead of four) successive pixel pairs may be calculated. Table 5 shows the offset and X values that may be used to calculate addresses for pixel pairs in the first transaction, which in this embodiment involves an evenly addressed line in the frame buffer. Note that for an odd address, the operations that take place during cycles 2 and 3 may be switched with cycles 0 and 1.

TABLE 5

Write Address Generator Operation for first transaction.

| Cycle | Offset Selected | X | Pixels Written (8 Interleaves) | Pixels Written (4 Interleaves) |
|---|---|---|---|---|
| 0 | First | 0 | 0, 1 | 0, 1 |
| 1 | First | 1 | 8, 9 | N/A |
| 2 | Second | 0 | 80, 81 | 40, 41 |
| 3 | Second | 1 | 88, 89 | N/A |

Note that while the above example referred to one specific embodiment, many other embodiments are also possible. For example, in another embodiment, each channel's bursts may be subdivided into several blocks that are randomly placed into a unified pixel buffer (as opposed to a pixel buffer that is partitioned between the various display channels). The size of these blocks may vary depending on the interleave configuration of the frame buffer. For example, if the frame buffer includes four interleaves, each block may hold eight pixels (or four pixel pairs). If instead the frame buffer includes eight interleaves, then each block may hold 16 pixels (or eight pixel pairs). In either configuration, it may take 10 blocks to store an entire burst from the frame buffer.

Pixels may be stored in display order within each block using a write address generator similar to the one described above. In one embodiment, two of the blocks may be filled at the same time. For example, if there are four interleaves in the frame buffer, four pixels may be received in a first transaction (e.g., pixels with the display order 0, 1, 40, and 41). One pixel pair (e.g., 0,1) may be stored in one block and another pixel pair (e.g., 40, 41) may be stored in the other block during this first transaction. In this embodiment, if the blocks each hold four pixel pairs, both blocks may be filled after four transactions. Accordingly, after the first transaction, the first block may store the pixels that have the display order 0–3 while the second block may store the pixels that have the display order 40–43. Similarly, if the frame buffer has eight interleaves and the blocks each hold eight pixel pairs, it may also take four transactions to fill two blocks with 8 pixel pairs each. In this embodiment, the same write address generator state machine may be used for both four- and eight-interleave frame buffer configurations. Note that this configuration may be extended or decreased (e.g., to support 16-interleave frame buffers and 16-pixel pair blocks or two-interleave frame buffers and two pixel pair blocks).

In one embodiment, the unified pixel buffer that contains the blocks may be able to store 1024 pixels. If the pixel buffer is designed to store pixel pairs, the pixel buffer may include 512 entries that are each two pixels wide. Thus, if each block stores four pixel pairs (e.g., the frame buffer has four interleaves), there may be 128 blocks, and if each block stores eight pixel pairs (e.g., the frame buffer has eight interleaves), there may be 64 blocks. If there are 128 blocks, each block may be uniquely identified by a 7-bit address, and if there are 64 blocks, each block may be uniquely identified by a 6-bit address. The pixels within each block may be identified based on which transaction they were received in. Thus, looking at the write address generator in FIG. 14, the base address generator may generate the base addresses of the two blocks to be filled during each transaction and the transaction number may be used to generate the offset that identifies where to store the pixels within each block. The offset may be concatenated to the base address to generate the write address.

As the blocks are filled, they may be placed, in display order, within a queue. During each transaction, one block may be filled with pixels that have a relatively early display order (e.g., if 80-pixel bursts are being received, pixels with the display order 0–39) while another block may be filled with pixels that have a relatively late display order (e.g., pixels with the display order 40–79). Every four transactions, two blocks may be filled. Thus, if 10 blocks store an entire burst, then blocks 0 and 5 (in display order) may fill after the first four transactions, blocks 1 and 6 may fill after the next four transactions, and so on. As each set of blocks is filled, pointers to the blocks with relatively early display order (e.g., blocks 0–4) may be pushed onto the queue. Pointers to the blocks with relatively late display order (e.g., blocks 5–10) may be temporarily stored, in display order, in a set of registers until all of the blocks with early display order have been pushed onto the queue. At that time, the pointers to the late display order blocks may be pushed, in display order, onto the queue.

Since data is in order in each block, and the blocks are in order in each queue, the pixels may be read out in the proper display order. For example, a read address generator may read the block addresses in order out of the queue to determine the order in which the blocks should be accessed. The block address may be concatenated with a counter value (e.g., the counter may count from 0–3 if each block stores four pixel pairs or from 0–7 if each block stores eight pixel pairs) to access each pixel pair. Using these read addresses, the pixels may be read out in the proper display order. This embodiment may offer more efficient use of pixel buffer memory since blocks from different display channels may be intermingled within the pixel buffer (as opposed to keeping the pixel buffer partitioned between the various display channels). In particular, this embodiment may be implemented using a smaller pixel buffer than would be feasible to use with a partitioned pixel buffer embodiment.

In another embodiment, the reordering may be done on the output side of the pixel buffer. Since the output side handles the reordering, the burst of pixels may be written into the pixel buffer in the order it is received from the frame buffer. Pixels or pixel pairs may be read out of the pixel buffer in the proper order by configuring a read address generator to generate read addresses. The read addresses may be generated based on the order in which the pixels are received from the frame buffer using formulas similar to the ones used to generate write addresses earlier (e.g., differences may include substituting read transactions for write transactions, etc.).

In some embodiments, different versions of the same graphics system may offer larger or smaller frame buffers. These different frame buffer capacities may be provided by either selecting larger or smaller memory devices for the individual interleaves, changing the number of interleaves, or both. The frame buffer may include memory devices other than 3D-RAMs in some embodiments. The order in which display information is provided from the frame buffer may vary depending on many factors, including the number of interleaves and the configuration of the hardware accelerator and/or frame buffer (e.g., how the hardware accelerator renders data into the frame buffer). Thus, the particular formula used to configure each read and/or write address generator may differ for each embodiment.

Figure 15:
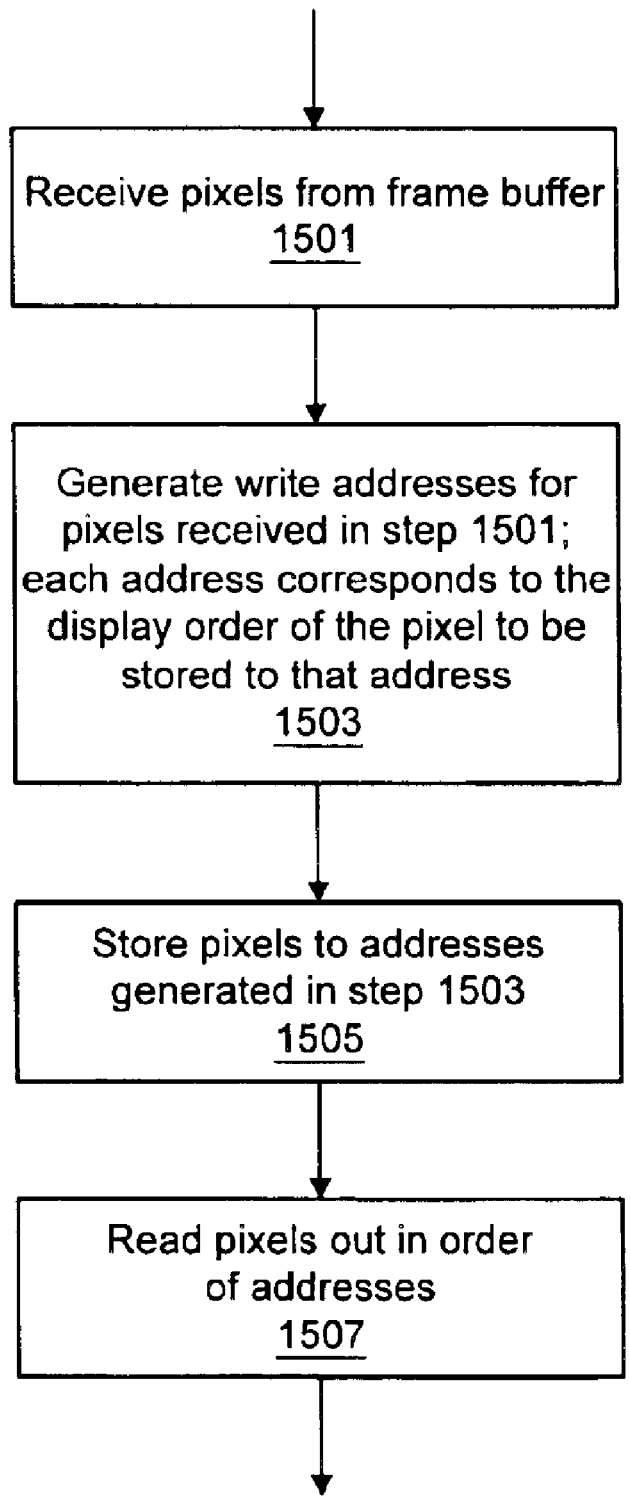
FIG. 15 is a flowchart of one embodiment of a method of reordering pixels.

FIG. 15 is a flowchart showing one embodiment of a method of reordering pixels output from the frame buffer. In this embodiment, pixels are received from the frame buffer, as shown at 1501. Since the pixels may not be in the proper display order, they may be reordered by generating write addresses that correspond to their display order, as shown at 1503, and then storing each pixel in the pixel buffer at the write address generated for it, as shown at 1505. This way, the pixels may be in display order in the pixel buffer, and they may be read out in the order of their addresses, as shown at 1507. Thus, even though certain pixels may be output by the frame buffer consecutively, they may not be stored at consecutive addresses if they are not consecutive with respect to their relative display order.

In some embodiments, the pixel buffer may be partitioned between the display channels, so each display channel may generate its own write addresses in its own pixel buffer space. In other embodiments, the pixels for each display channel may be intermingled within the pixel buffer (e.g., within each block, pixels may correspond to a single display channel, but the blocks may be intermingled within the pixel buffer). In these embodiments, generating write addresses may also involve generating information that tracks which portions of the pixel buffer are allocated to which display channel and/or generating information that tracks the proper display order of each display channel's blocks.

Figure 16:
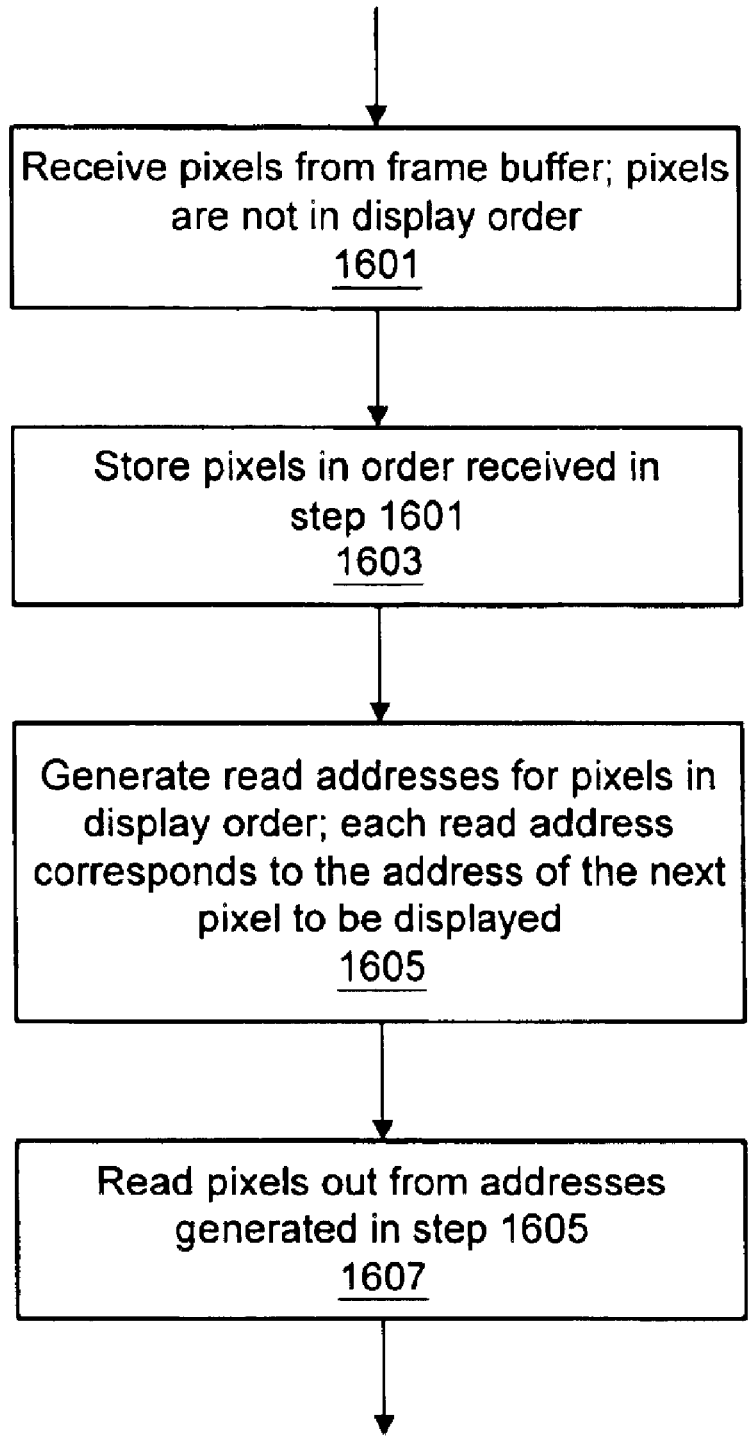
FIG. 16 is a flowchart of another embodiment of a method of reordering pixels.

FIG. 16 shows another embodiment of a method of reordering pixels. In this embodiment, the pixels may be received from the frame buffer out of order. Instead of reordering the pixels as they are stored in the pixel buffer, as shown in FIG. 15, the pixels may be stored in the pixel buffer in the order that they are received from the frame buffer. In order to read the pixels out of the pixel buffer in the proper display order, a read address generator may generate read addresses that access the pixels in the correct display order. Thus, the reads may bounce around in the pixel buffer, as opposed to accessing consecutively addressed pixels in address order.

Synchronizing Multiple Display Channels

In many situations, it may be useful to synchronize the vertical blanking intervals of multiple display channels. For example, in stereo display (e.g., where left and right images are provided to the user's left and right eyes by a pair of stereo goggles), virtual reality, and video recording, distracting visual effects may occur unless the various display streams are synchronized. For example, if the displays in a stereo display system are not synchronized, the left image and right image may not display left- and right-eye views of the same image at the same time, which may disorientate the viewer.

Each display stream may have its own display timing generator (DTG). While each of the DTGs for the display streams which are to be synchronized may be set to use the same timing, variations in the reference frequencies used by each display stream may eventually cause their respective video timings to drift relative to each other. To solve this problem, methods of synchronizing multiple display channels have been devised which involve setting one display channel as the "master" channel and setting the other display channel(s) to be "slave" channels. The slave channels may be configured to synchronize their vertical blanking intervals to the master's by jumping to the vertical blanking interval whenever they detect the master's vertical blanking interval beginning.

As shown in FIG. 8, several display channels may prefetch display information from a shared frame buffer. Additionally, it may be desirable to prefetch display information even when the display channels do not share a frame buffer. One problem with existing methods of synchronizing multiple display channels is that these methods do not work in systems where each display channel is prefetching display data. For example, if a slave display channel is prefetching data, there may still be prefetched data in the slave's pipeline when the master's vertical blanking interval begins. As a result, the slave may not be able to jump to its vertical blanking interval and begin displaying the next frame because it has already prefetched all or some of the remaining data for the current frame. Thus, in order to synchronize display streams that are prefetching data, the prefetched data in the slave's display stream must be dealt with.

Figure 17:
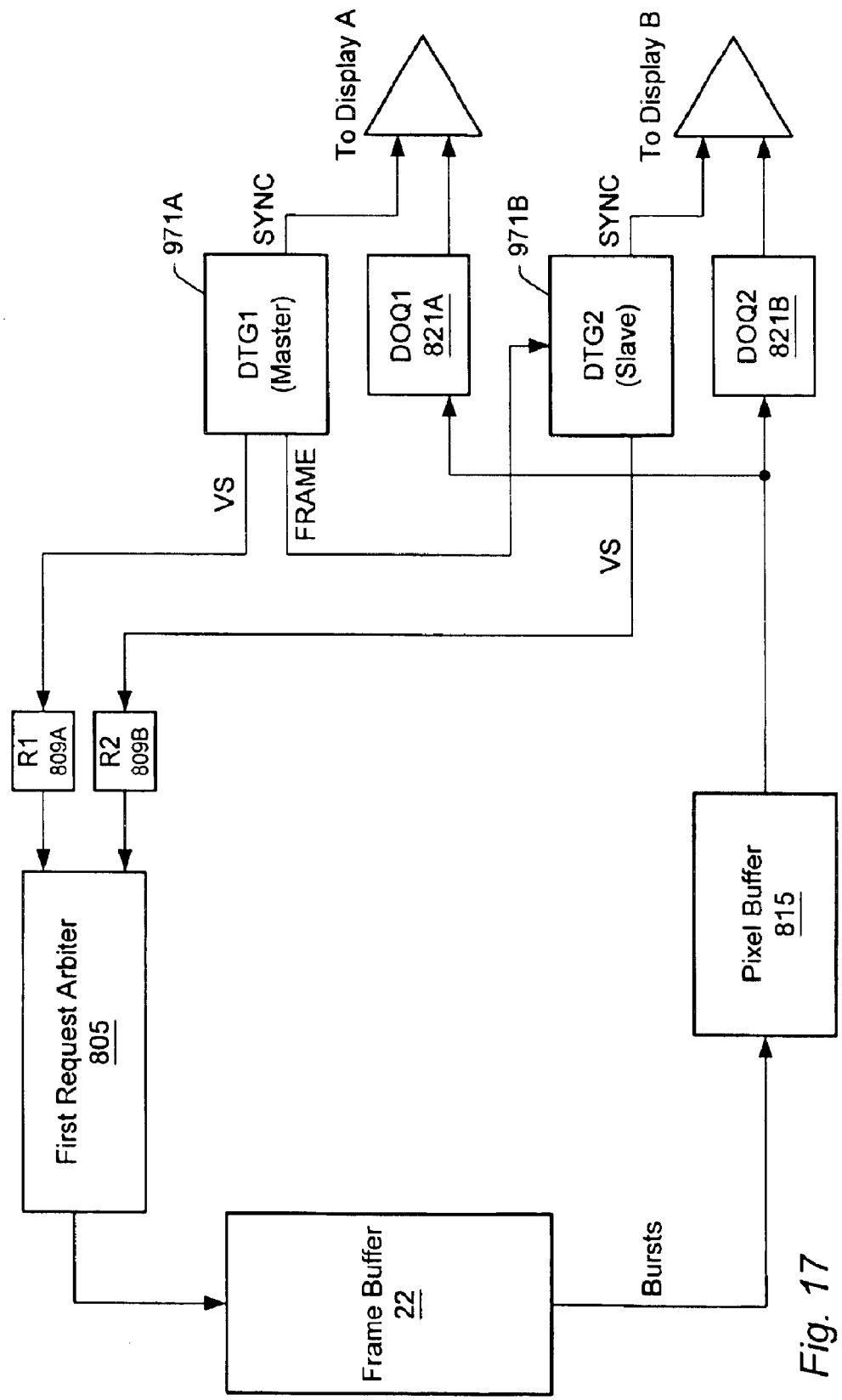
FIG. 17 shows one embodiment of a graphics system configured to synchronize multiple display channels.

FIG. 17 shows one embodiment of a system configured to allow the synchronization of display streams. This embodiment may be used with display channels that prefetch display information as well as with display channels that do not prefetch display information. Each channel's DTG 971 may be configured to output a VS signal to its channel's burst requester 809 so that the burst requester may begin prefetching data (e.g., so the burst requester prefetches data from a time just before the end of the vertical blanking interval until a time just before the beginning of the next vertical blanking interval). Furthermore, each DTG 971 may output SYNC signals to a display.

Each display channel's DTG may also be configured to operate as either a master or a slave. When in a default operating mode, each channel may be a master (and thus if there is more than one channel operating, the channels may not be synchronized). When one or more channels are set to be slaves, their display timing generators 971B may take the frame signal from a master DTG 971A as an input. In some embodiments, each channel may be configured to receive the master's signal from either another DTG 971 A in the same output controller or from an external device (i.e., the master may not share a frame buffer and output controller with the slave).

Figure 18:
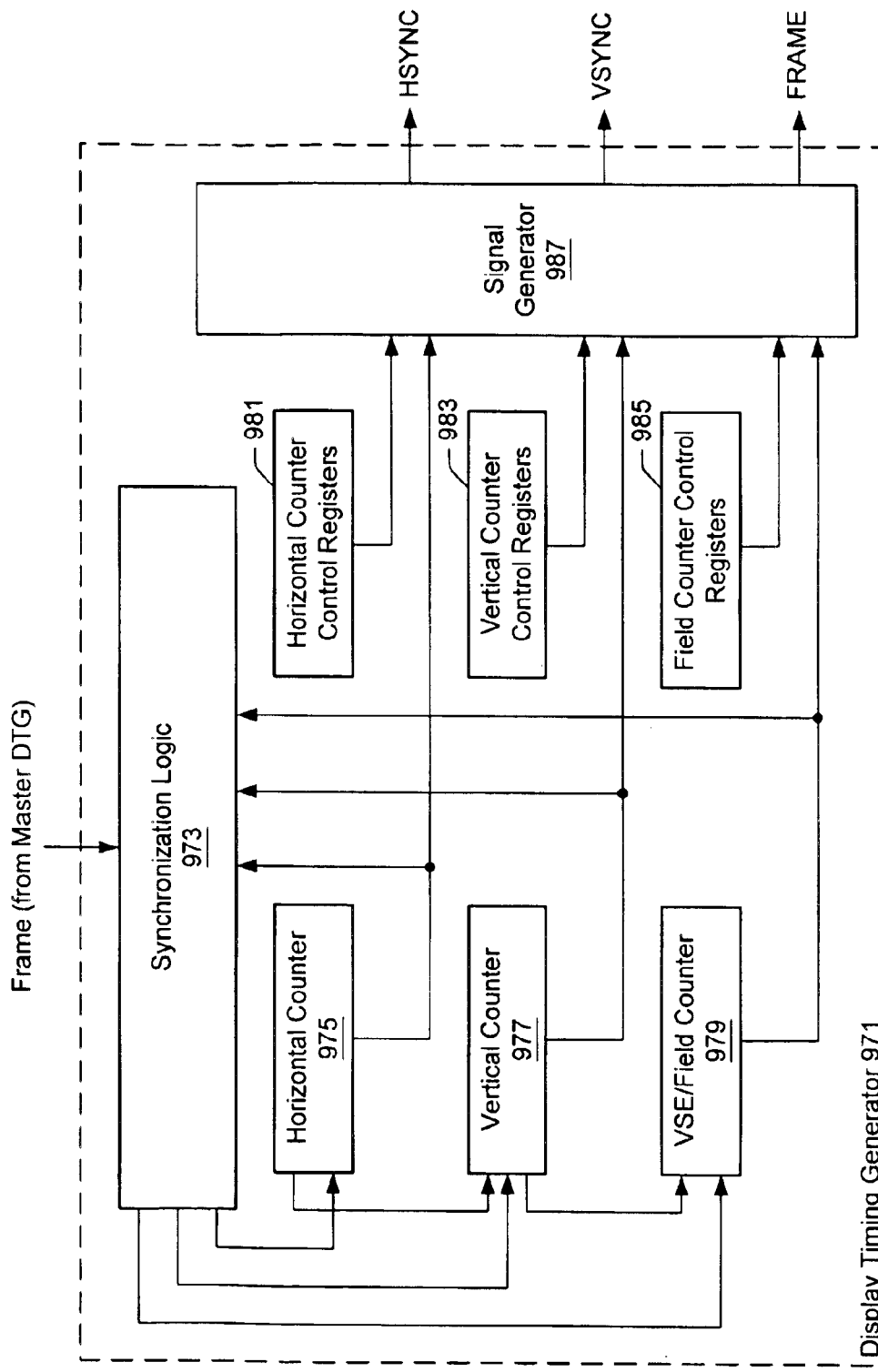
FIG. 18 shows one embodiment of a display timing generator.
Figure 19:
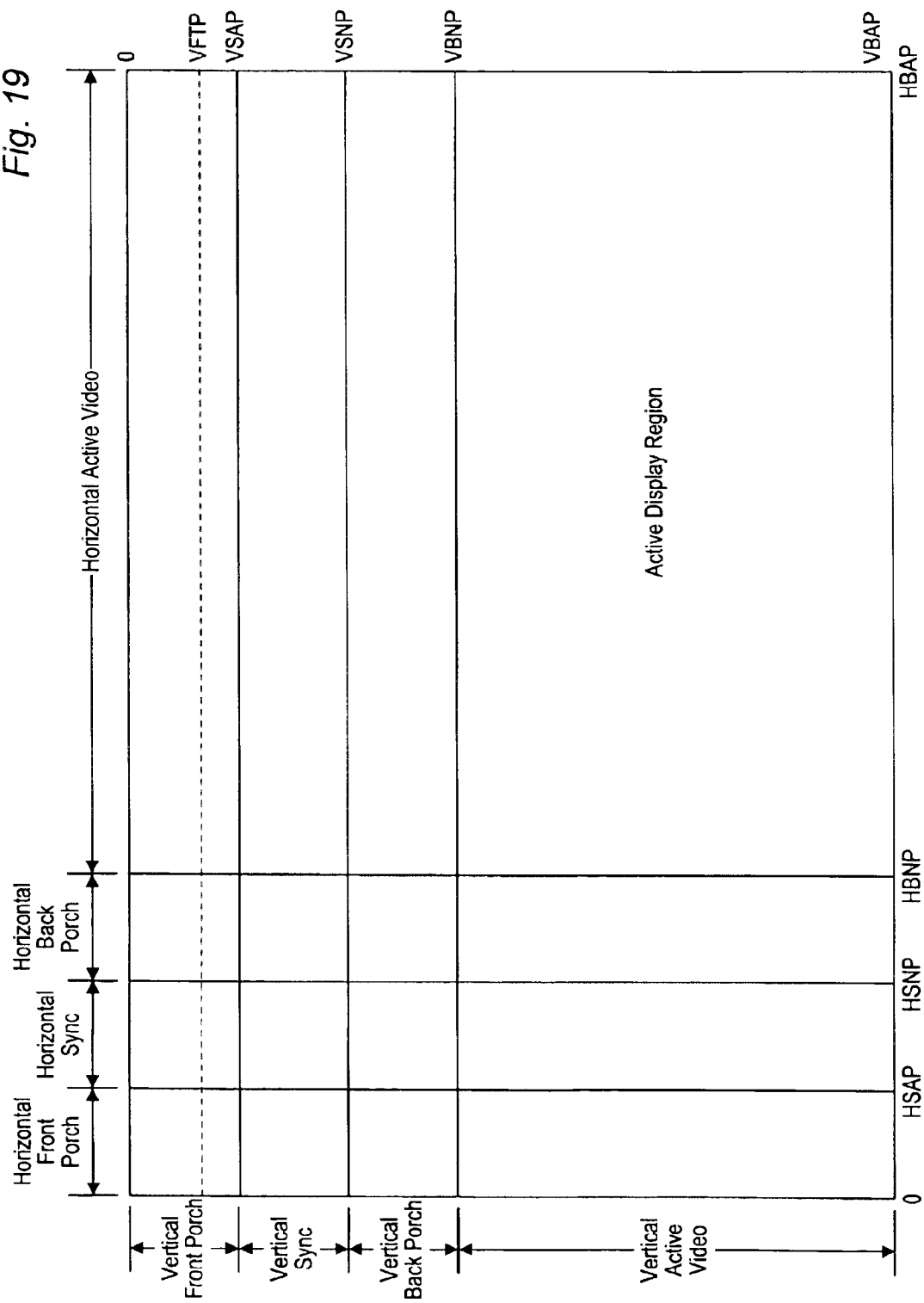
FIG. 19 illustrates synchronization signals and blanking intervals according to one embodiment.

As shown in FIG. 18, one embodiment of a DTG 971 may be implemented as a series of nested counters. In this embodiment, the DTG 971 includes horizontal counter 975 that may control the timing of each horizontal line. For example, the horizontal counter 975 may start at zero and may be incremented each pixel clock until it reaches the end of the line (HBAP, as shown in FIG. 19). Once the counter 975 reaches the end of the line, it may reset to zero and begin counting for the next line.

The DTG 971 may also include a vertical counter 977 that counts scan lines within each field. The vertical counter 977 may be incremented each time the horizontal counter 975 reaches the end of a line (i.e., HBAP). The vertical counter 977 may start counting from 0 at the beginning of a field and continue until the end of the field (VBAP, as shown in FIG. 19). After reaching the end of the field, the counter 977 may be reset to zero on the next HSAP so it can begin counting the next field.

The DTB 971 may also include a VSE/Field counter 979 that may be configured to count fields in each frame. For example, for a non-interlaced frame, there may be one field per frame, while for an interlaced field sequential color frame, there may be six fields per frame. If the counter 979 is configured as a VSE (Vertical Sync Elongated) counter, the first vertical sync period (e.g., when the counter equals zero) in each frame may be elongated (e.g., this mode may be used in field sequential color mode to lengthen the vertical sync period whenever the red field is being written). The VSElField counter 979 may start counting at zero at the beginning of each frame and increment each time the vertical counter 977 equals VBAP and the horizontal counter 975 equals HSAP. Once the counter 979 reaches the final field in the frame, it may reset to zero on the next occurrence of VBAP and HSAP.

The DTG output may be programmed by setting the values within a set of control registers. These control register may be compared to the values in each of the counters in order to generate certain sync pulses. The DTG 971 may output sync pulses (e.g., HSYNC, VSYNC, CSYNC) and/or blanking signals to the display. FIG. 19 shows one example of the sync pulses and blanking signals that may be provided and how they correspond to the displayed pixels. The vertical front porch is defined as the time between line 0 and VSAP (vertical sync assertion point). The vertical sync period occurs between the VSAP and the VSNP (vertical sync negation point). Thus, the DTG may assert the vertical sync signal to the display during the vertical sync period. The vertical back porch occurs between VSNP and VBNP (vertical blanking negation point). The vertical active display period occurs between VBNP and VBAP (vertical blanking assertion point). The vertical blanking period occurs between VBAP and VBNP.

The horizontal front porch occurs between column 0 and HSAP (horizontal sync assertion point. The horizontal sync period occurs between the HSAP and HSNP (horizontal sync negation point). Thus, the DTG may assert the horizontal sync signal during the horizontal sync period. The horizontal back porch occurs between the HSNP and NBNP (horizontal blanking negation point). The horizontal active display period takes place between the HBNP and the HBAP (horizontal blanking assertion point). The horizontal blanking period occurs between HBAP and HBNP.

Thus, in order to generate the sync signals, the DTG control registers may include values representing HSAP, HSNP, VSAP, VSNP, and so on. These values may be compared to the current values of the horizontal and vertical counters and, if they are equal, appropriate signals may be asserted or negated.

FIG. 19 also shows a VFTP (vertical frame toggle point). Each VFTP may occur during the vertical blanking interval of its respective display channel. The VFTP may be a point at which the FRAME signal, which is used to distinguish between successive frames, toggles to indicate that a new frame is beginning. Each channel's FRAME signal may toggle in response to one or more of the DTG counters reaching a certain value. Since the VFTP delineates different frames, the time at which a display channel reaches its VFTP may be referred to as a "frame event." In the following embodiments, the VFTP for each display channel may occur between line 0 and VSAP (i.e., during the vertical front porch). In order to synchronize display channels to each other, the slave display channels may be configured to jump to their VFTP (as opposed to progressing normally through each successive frame) in response to an indication that the master display channel has reached its VFTP.

Thus, in response to the master display channel's frame event (i.e., to the master display channel reaching its VFTP, as indicated by the master's FRAME signal toggling), the slave display channel(s) may be configured to finish displaying any active display of the current frame before jumping to their VFTP, thereby skipping the lines between VBAP and VFTP. If a master frame event is received by the slave while the slave's DTG is within the vertical front porch, the slave's DTG may wait until the end of the current horizontal line before jumping to the VFTP. If a frame event is received while the slave is outside the vertical front porch, the slave's DTG may wait until it enters the vertical front porch (i.e., until VBAP and HBAP) before jumping to the VFTP.

In the embodiment of the DTG 971 shown in FIG. 18, jumping to the VFTP may involve setting the horizontal counter 975 to a value of HSAP+1. Similarly, the vertical counter may be set to VFTP+1, and the VSE/Field counter may be set to the next field (or, if a new frame is beginning, the VSE/Field counter may be set to zero).

Since in this embodiment, the slave waits until the end of active display (e.g., until VBAP and HBAP) before jumping to the toggle point, there may be no remaining pixel data in the pixel buffer and/or output queues during each blanking interval. Additionally, since jumps occur during the blanking interval, no displayed frames may contain junk data (e.g., prefetched data from the prior frame). However, since jumps occur during the blanking interval, the size of the jumps is limited (e.g., the maximum jump equals the difference between VBAP and VFTP). As a result, it may take several jumps before the display channel is synchronized to the master. This may take several seconds if the difference between the master and the slave is significant. Accordingly, this embodiment may be referred to as "catch-up" synchronization. Since the jumps are small, it is unlikely that the display will detect the discontinuity and lose synchronization temporarily. As a result, the viewer will most likely not notice any abnormalities during synchronization (except for any abnormalities that result from the displays being out of sync during the time it takes to synchronize the displays).

Several other techniques for synchronizing display channels that prefetch data are also available. For example, in another embodiment, the slave's DTG may wait until the end of the current scan line (as opposed to the end of active display) before jumping to the VFTP. In this embodiment, any two display channels may be synchronized within three frames, regardless of how out-of-synch the two display channels were before the synchronization event, if the synchronization event occurs outside of the blanking period. This embodiment may be thought of as "vertical immediate" synchronization.

In vertical immediate synchronization, when a synchronization event occurs outside of the blanking interval, the current frame may be abandoned by having the DTG jump to the VFTP. However, the burst requesters for the slave display channel may still be requesting data for the interrupted field or frame and/or there may still be display information for the interrupted field or frame in the slave's pipeline (e.g., the display output queue or the pixel buffer). When the slave's DTG reaches the active display point after the jump, the remaining pixels (which were already in the pipeline at the time of reset or which were requested by the non-reset burst requesters) may be output to the screen. Since this data was part of the previous frame, this output may appear as "junk" on the display. Before this junk frame ends, the slave's display output queue (DOQ) may run out of pixels (since the interrupted frame may now be completely output to the display, albeit in a mixed-up order). As a result of the DOQ underflowing, garbage pixels may be output for the remainder of this field. Once the DTG enters the next blanking period, the underflowed-DOQ may be reset to an empty state so that it may begin receiving the next frame.

Additionally, one or more of the slave DTG's output signals (e.g., the VS signal) may be used to reset the slave's burst requester. For example, in one embodiment, each burst requester may be configured to continue to assert requests until it has requested an entire frame of display information. As a result, the burst requester in the slave display channel may continue to assert requests for the interrupted frame even after the slave's DTG has jumpted to its VFTP. However, the burst requester may finish requesting display information for the interrupted frame during the next active display period (which is displaying the junk frame that includes the remaining pixels for the previous frame as well as the garbage output from the underflowed DOQ). Once the burst requester finishes requesting data from the interrupted frame, it may be configured to wait for the next VS signal. In response to receiving a VS signal, the burst requester may begin prefetching display information for the frame specified in the VS signal. Thus, when the slave DTG generates the next VS signal after the junk frame, the burst requester may begin asserting requests for the specified frame. Note that from the perspective of the master display channel and the slave DTG, this new frame is the second frame after the interrupted frame, since the master may have output a non-garbage frame during the following active display period and the slave DTG was generating timing signals for the junk frame during that period. Accordingly, the VS signal provided to the burst requester from the slave DTG may indicate that the burst requester should begin asserting requests for the second frame (frame F+2) of display information after the interrupted frame (frame F), causing the intermediate frame (frame F+1) in the frame buffer to be skipped.

Thus, by the end of the junk frame, the DTG, the burst requester, and the DOQ may all be ready to begin displaying the appropriate field or frame of the display information. Similarly, the next field or frame may be synchronized to the master. Note that if the master's frame event occurs during the slave's vertical front porch, there may not be any prefetched data in the pipeline, and thus the slave may be able to sync to the master without having to output a junk frame.

Since there may be a frame of garbage data, the user may notice the synchronization in this vertical immediate synchronization embodiment. Additionally, since the jump to the VFTP may interrupt vertical synchronization, there is a possibility that the display may temporarily lose synchronization, resulting in a noticeable blanking of the display. However, since the horizontal synchronization is uninterrupted (due to waiting for the end of the current line before jumping to the VFTP), this possibility may be insignificant and may occur infrequently.

In yet another embodiment, referred to as horizontal and vertical immediate synchronization, the DTG may jump to the VFTP as soon as it detects a synchronization event, without waiting for the end of the current scan line to be displayed. While this may provide faster synchronization than the methods described above, it may also be more likely to cause the display to temporarily lose synchronization since both the horizontal and vertical synchronization may be interrupted. Furthermore, like the previous embodiment, this embodiment may generate a frame of garbage data if some of the remaining display information in the interrupted frame has already been prefetched.

In one embodiment, a graphics system may be configured to implement several different techniques of synchronizing multiple display streams. For example, the system may include a catch-up method, a vertical immediate method, and a horizontal and vertical immediate method. The particular technique to use may be indicated by the current value of a control register. In such an embodiment, the user may be able to select which synchronization method to use.

Figure 20:
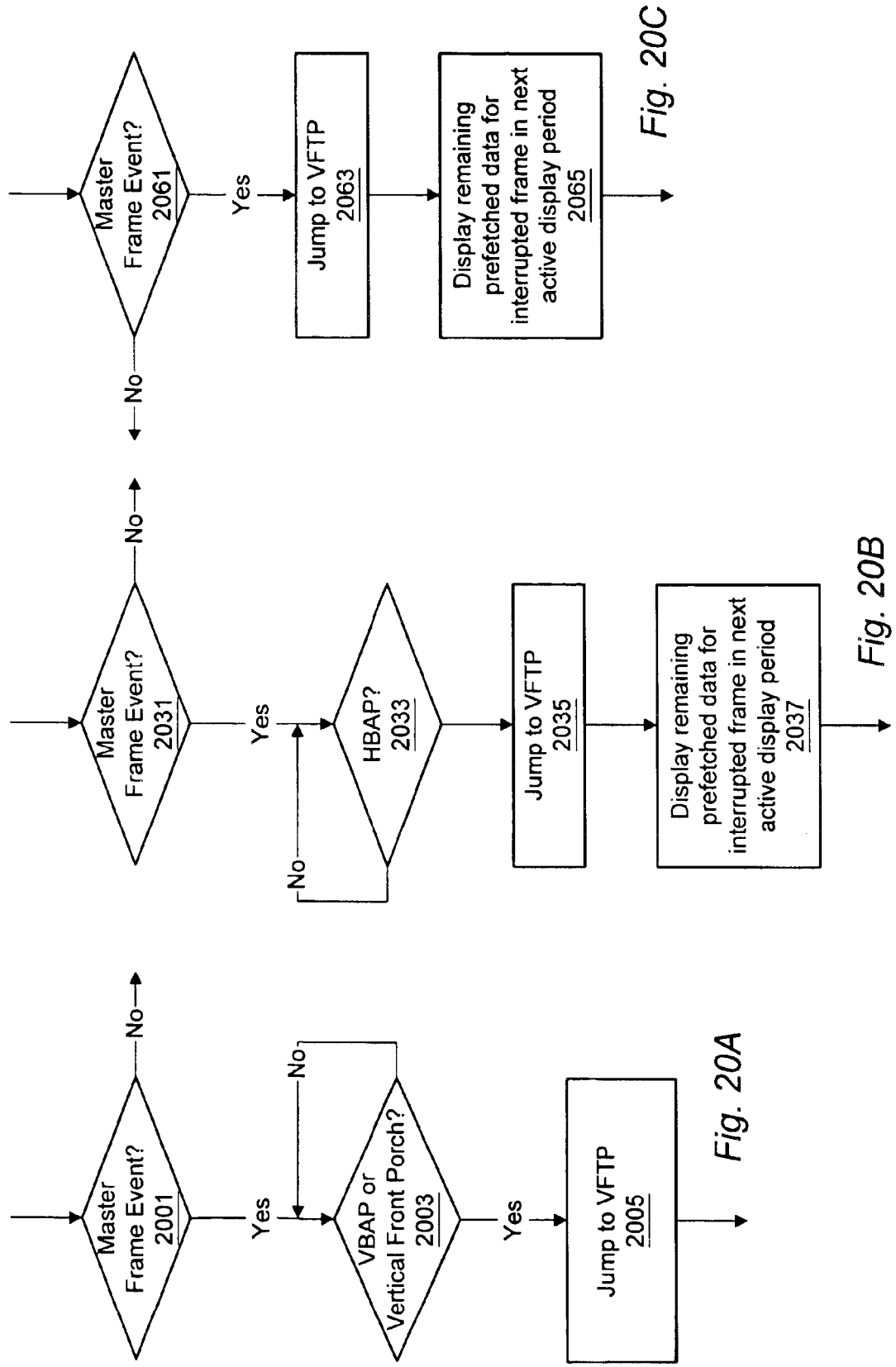
FIG. 20A shows one embodiment of a method of synchronizing multiple display channels.
FIG. 20B shows another embodiment of a method of synchronizing multiple display channels.
FIG. 20C shows yet another embodiment of a method of synchronizing multiple display channels.

FIGS. 20A–20C illustrate several different methods of synchronizing multiple display streams. In the embodiment shown in FIG. 20A, if a master frame event is detected, a slave display channel may wait until the end of the active display period (i.e., until VBAP and HBAP) before jumping to the VFTP. If the master frame event is detected while the slave is in its vertical front porch period, the slave may wait until the end of the current line (i.e., HBAP) and then jump to the VFTP. This process may repeat until the slave display is synchronized to the master. Note that there may be multiple slave display channels, and that one or more of the slave display channels may not be prefetching data.

FIG. 20B shows a different embodiment that may be used when the slave channel(s) prefetch data. Here, in response to detecting the master's frame event, the slave's DTG may wait until the end of the current line (i.e., HBAP) and then jump to its VFTP, as shown at 2033 and 2035. If the slave was in its active display period just before it jumped, it may still have prefetched data for the abandoned frame in its pipeline. To clear its pipeline, the slave display channel may output the remaining data in the next active video period, as indicated at 2037. If the prefetched data runs out before the active video period ends, garbage pixels may be output for the remainder of that active video period. After this "junk" frame, the pipeline may be clear, and thus the slave may be ready to properly display the next frame. If the slave was in its vertical front porch period when the master frame event was detected, there may not be any prefetched data for the previous frame in the pipeline, and thus the slave display channel may not output a junk frame.

In the embodiment of FIG. 20C, the slave display channel may jump to its VFTP immediately, instead of waiting for the end of active display or the end of the current line, when it detects the master's frame event. Since there may still be prefetched data in the slave's pipeline, it may output any remaining data for the previous frame in the next active display period as a junk frame. As in the embodiment shown in FIG. 20B, there may be no need to output a junk frame if the master's frame event is detected while the slave is in its vertical front porch.

Panning While Displaying a Portion of the Frame Buffer Image

Often, only a portion of the image in the frame buffer may be displayed on the display. For example, the frame buffer image may be larger (i.e., contain more pixels) that a particular display is capable of displaying. Alternatively, two or more displays may be configured so that one display shows the complete image while the other display(s) show one or more portions of the image. This functionality may be used in presentations where the complete image is shown on one display while a portion of the image (e.g., one particular window) is output to another display to be saved on videotape. In yet another configuration, several individual displays may be configured so that each display shows a different portion of the frame buffer image.

When viewing a portion of the frame buffer image, a user may desire to pan around so that other portions of the frame buffer image can be seen. For example, a user may press arrow keys or adjust a scroll bar by moving a mouse to indicate the direction and/or speed of panning that is desired.

When panning from one portion of the frame buffer image to another, it may be desirable to display a smooth image that is free of jagged edges and other artifacts during each frame in which the panning is taking place. In order to shift from displaying one portion of the frame buffer image to another, certain raster-related parameters (e.g., the coordinates of the upper left hand corner of the zoomed portion of the frame buffer image) may be adjusted. However, if these parameters are adjusted during the active display period, portions of each frame may be processed using different raster parameters, resulting in distracting visual artifacts during the panning period.

Figure 21:
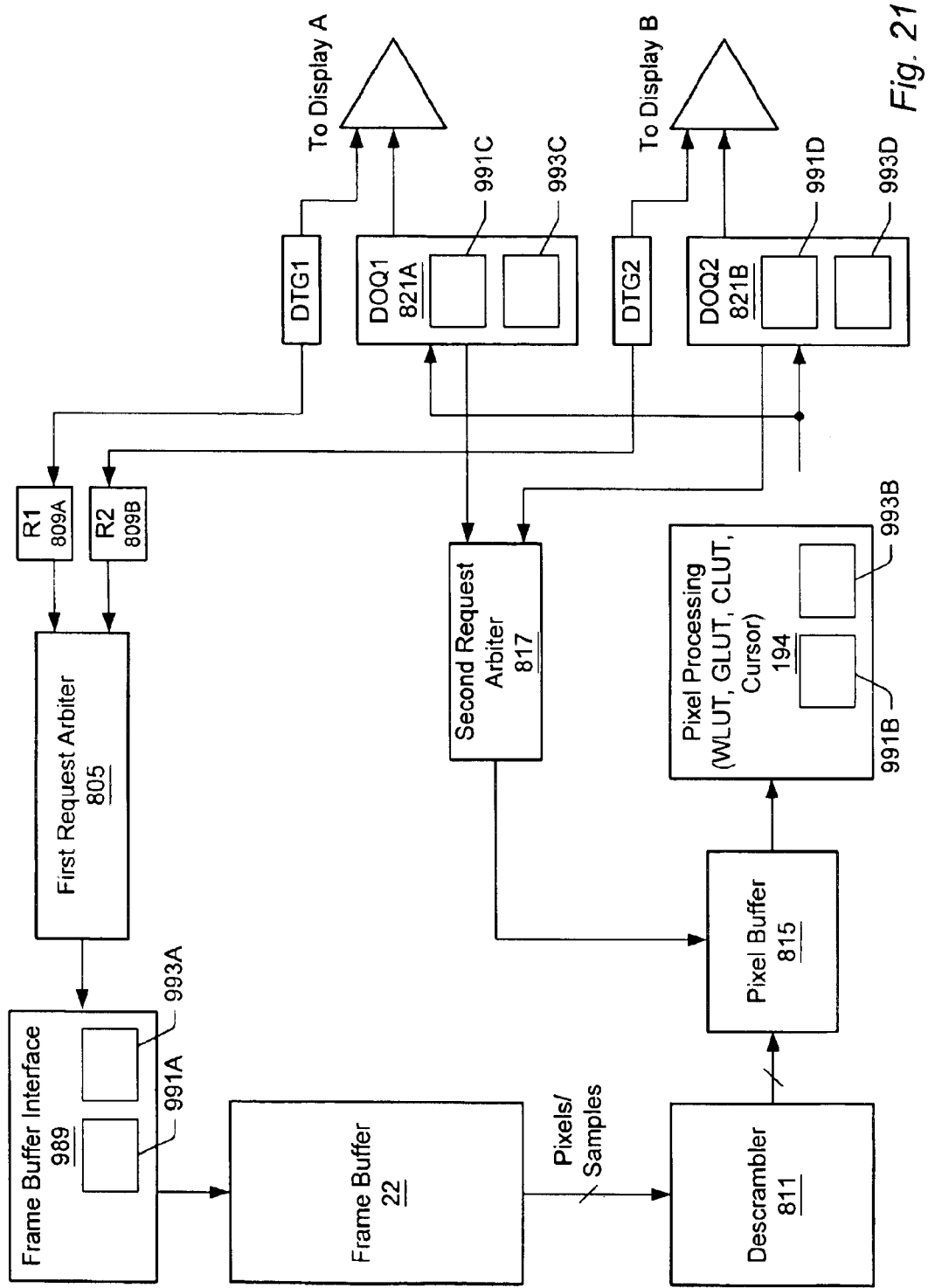
FIG. 21 illustrates one embodiment of a graphics system configured to pan across a portion of a frame buffer image.

In order to avoid undesired visual artifacts, a graphics system may constrain the times at which the raster parameters may be updated. FIG. 21 shows one embodiment of a graphics system that may be configured to smoothly pan across a frame buffer image. The graphics system may maintain two sets of registers to hold each of the raster parameters involved in a panning operation. One set of registers 991 may be the active set that is used to access and process display information. The other "shadow" set of registers 993 may be the set that is updated by software (e.g., in response to a user initiating a panning operation). To update the registers that are actually used by the output controller, the shadow register values may be copied to the active register values. In order to smoothly pan across the image in the frame buffer, the times at which the shadow register values may be posted to the active register values may be constrained to times during the panning display's blanking interval.

The screen address register is one raster parameter that may be shadowed. The screen address register may store a value that determines whether the next frame of display information for a particular display channel starts on an even or odd line.

Other raster parameters that may be shadowed are the display address generator registers 991A. Each of these registers may store values representing the starting address of a particular display channel's image within the frame buffer memory and/or a value representing the configuration of the frame buffer.

The margin trimming registers 991B, which may store values indicating where the screen begins and ends within requested bursts, may also be shadowed. The margin trimming registers may be used when the size of the display does not align perfectly with burst boundaries.

Additional raster values may also be shadowed. For example, the horizontal burst count register 991C/991D for each display channel may be shadowed. The horizontal burst count may describe the number of bursts of display information from the frame buffer needed to provide a single scan line to a particular display channel. For example, if each burst provides 80 pixels to a display channel and the display is a 1280×1024 CRT, the horizontal burst count register for that display channel may indicate that there are 16 bursts per line.

In order to update the active set of registers, software may first write the updated values to the shadow registers. Once the shadow registers have been updated, the software may assert a request that the shadow register values be posted to the active registers. This request may indicate when the post should occur. For example, if the panning display channel has one or more fields of data per frame, the request may specify that the post should take place after the current frame is complete. Alternatively, if there are multiple fields per frame, the request may indicate that the update should occur after the current field finishes. In response to receiving such a request, the various components that have shadow registers (e.g., the pixel processing unit 194, the frame buffer interface 989, and the display output queues 821) may post the values in the shadow registers to the active registers.

Once the active registers are updated, the next frame of data may be output from the frame buffer and processed based on the new values. For example, if the value in the display address generator register was updated to indicate that the upper left corner of the portion of the image to be displayed on the panning display has been shifted right 4 pixels, the next frame output from the frame buffer to the panning display channel may begin 4 pixels to the right of the image in the previous frame.

If the panning display channel is prefetching data from the frame buffer, the parameter registers that affect how data is accessed in the frame buffer (e.g., the screen address register and video address generator register) may be updated as soon as the final burst for the current field or frame (as specified in the update request) has been provided by the frame buffer. Similarly, the registers that affect how pixels are processed in the pixel processing unit may be updated as soon as the last pixels in the frame flow past that point in the pipeline.

In order to update each raster parameter register at the proper time (e.g., after the data for the current field or frame has already passed through that section of the graphics system), tokens may be used to indicate the end of each field or frame. For example, looking at FIG. 21, software may receive an indication from a user that initiates a panning operation and describes what type of panning operation should take place. Based on the user's indication, the software may calculate new values for the raster parameters and write these values to the shadow registers 993. The software may also write a value to a post raster request register (not shown) that indicates that the shadow registers 993 should be posted to the active registers 991 at the next possible opportunity (e.g., during the next blanking interval). In response to the new value in the post raster request register, the burst requester 809 for the panning channel may send a post raster request to the frame buffer interface 989.

When the frame buffer interface 989 receives the post raster request, it may post any shadow registers 993A it maintains to its active registers 991A and send an acknowledgement (but not display information) to the output processor. This acknowledgement notifies the output processor that the previous frame is complete (at this point in the pipeline). In order to update the other raster registers 991 at the proper time (i.e., when the pixels for the current frame have passed that point in the pipeline), the output processor may insert a post raster token into that panning channel's display stream in response to the frame buffer interface's acknowledgement. As the post raster token flows through each portion of the pipeline, the registers that affect how the pixels are processed in each portion of the pixel processing pipeline may be updated. When the token enters the panning display's display output queue 821, the display output queue 821 may wait until it is empty and then update its raster parameter registers 991.

Thus, by updating the raster parameters during the blanking interval after the last pixel has been processed at each respective point along the panning display's pipeline, undesirable effects in the output display may be avoided. Using an end of field or end of frame token allows each component in the pipeline to identify when it has finished operating on the display information from the previous frame. Thus, each component may use the tokens to recognize when it may post the shadow register values to the active registers.

Figure 22:
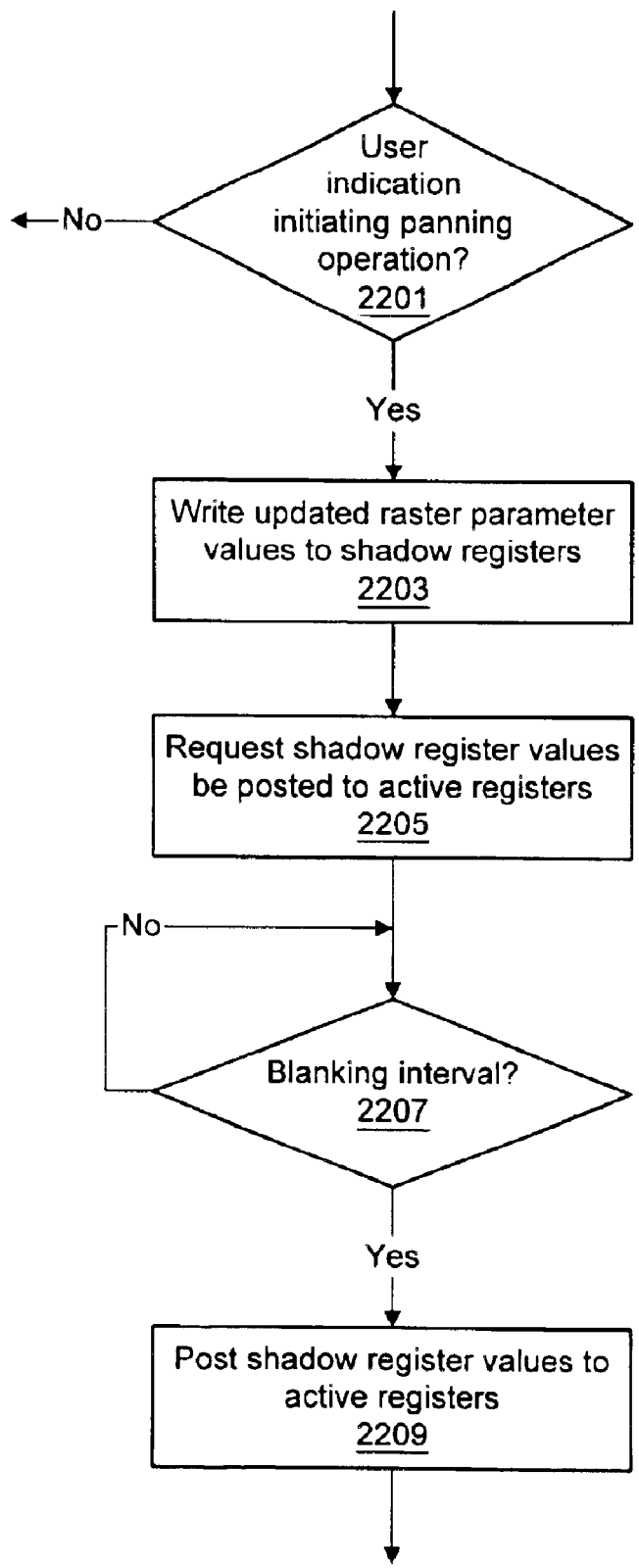
FIG. 22 shows one embodiment of a method of panning across a frame buffer image.

In some embodiments, some of the raster parameter registers (e.g., the registers in the pixel processing unit) may be shared between multiple display channels. Since these display channels may not be synchronized, it may be useful to designate one display channel as the controlling channel for determining when to post the shared shadow register values to the shared active registers. For example, tokens in the controlling display channel may be used to determine when to update the raster parameter registers. Note that if the panning display channel is not the controlling display channel, the shared raster parameter registers may be updated during the panning display channel's active display period. In such an embodiment, it may be useful to synchronize the panning display channel to the controlling display channel FIG. 22 shows one embodiment of a method for panning across the image in the frame buffer. In step 2201 through 2203, if a user indication initiates a panning operation, the updated raster parameter values needed for the panning operation are written to the shadow registers. At 2205, a request for the shadow register values to be posted to the active registers is issued. In order to avoid updating the raster parameter registers while the current frame is being processed, each component of the graphics system that has one or more shadow registers may wait until it enters the next blanking interval before posting the shadow registers to the active registers, as indicated at 2207 through 2209. For example, each component may wait until it receives an end of field token before updating its raster parameter registers with the values from the shadow registers. Note that in some embodiments, the tokens that signal certain registers to perform raster parameter updates may correspond to a different display channel than the panning display channel. After the shadow register values have been posted to the active registers, the next frame may be processed using the updated raster parameter values.

Signature Analysis

Signature analysis is a method of hardware testing. It involves calculating the signature of a known set of data, usually after this data has passed through some hardware under test. By comparing the calculated signature with a known correct signature for the same set of data, a pass/fail determination of the hardware under test may be made. In graphics systems, a useful set of test data may be a frame (or set of frames) of display information.

In order to provide testing capabilities, some embodiments of a graphics system may include signature analysis hardware. The signature analysis hardware may include one or more signature analysis registers (SARs) that capture display information as it flows through the video output controller. Each SAR maybe initialized to a "seed" value or signature and, as display information is captured, it may be added to the signature.

Figure 23:
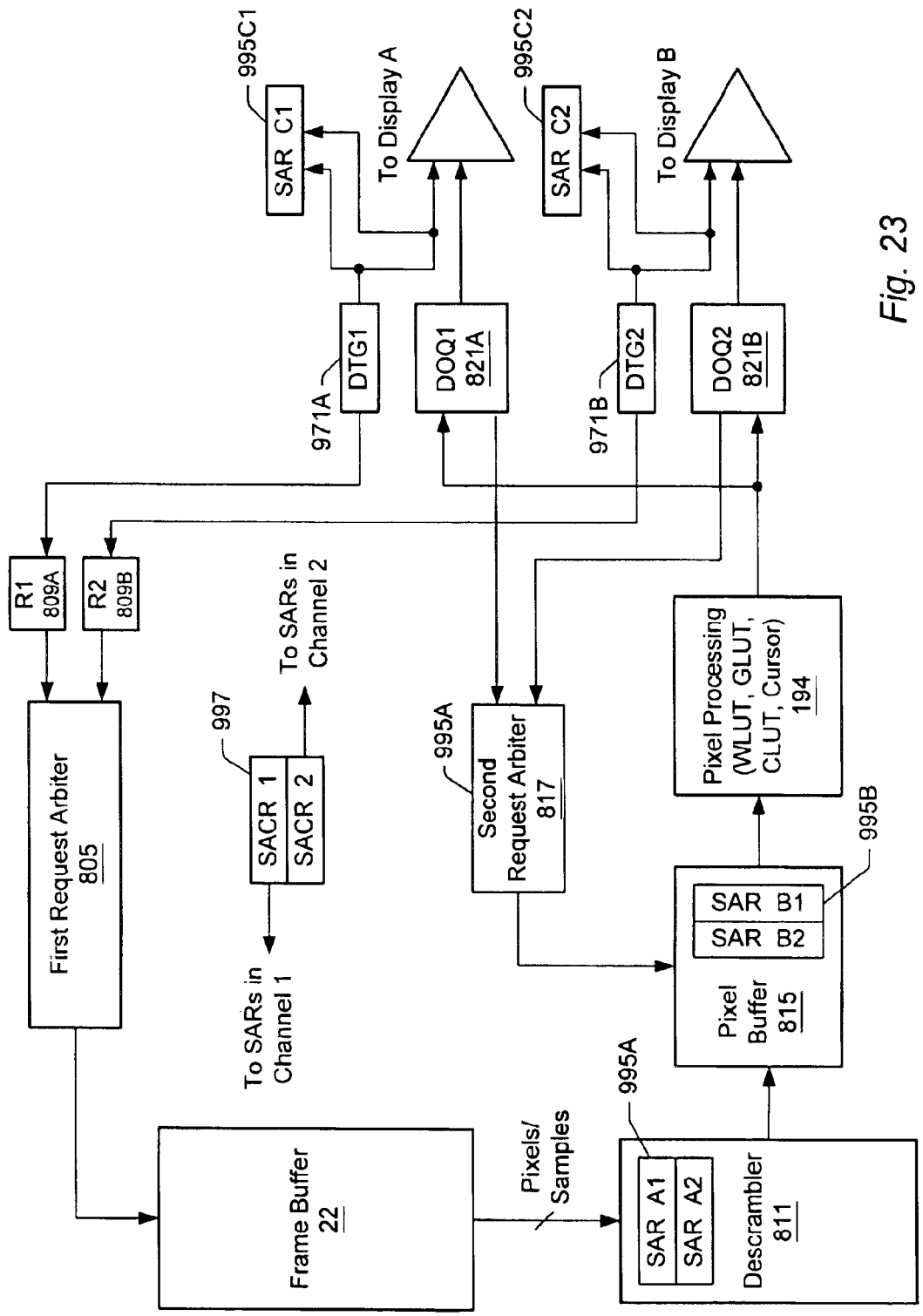
FIG. 23 shows one embodiment of a graphics system that includes multiple signature analysis registers.

FIG. 23 shows one embodiment of a graphics system that includes multiple SARs 995. The SARs may be arranged so that the signature in each may be used to verify a certain section of the graphics system. For example, SARs A may be used to test the interface from the frame buffer 22, while SARs B may be used to test the output of the pixel descrambler 811 and the pixel buffer 815. The pixel processing unit 194 and DTGs 971 may be tested using the signatures captured in the SARs C. The SARs C may capture both display information and control signals. Additional SARs may also be included in other locations within the graphics system (e.g., at the interface between the frame buffer and the hardware accelerator in order to capture display information as it is rendered into the frame buffer). Also, since there may be multiple display channels, separate SARs may be included for each display channel (e.g., FIG. 23 shows SARs for both display channel 1 and display channel 2). As described above, the display information may be reordered and/or additionally processed as it flows through the graphics system, so the final signature stored in each SAR may differ from each of the other signatures.

Each display channel's SARs may be controlled by a signature analysis control register (SACR) 997. Each SACR may provide signals to each of its display channel's SARs that enable signature capture and/or that control how many frames each SAR captures. The SACRs may be coupled to the SARs by a signature analysis signal bus (not shown). Note that in other embodiments, the individual SARs may include the functionality of the SACR.

Thus, the various SARs may be used to pinpoint sections of the graphics system that are not working properly. If additional pinpointing is desired (e.g., pinpointing a malfunctioning interleave in the frame buffer), several different test images may be designed that each stress particular hardware. Depending on which of these tests pass and which fail, the flawed hardware may be detected.

Signature capture may be controlled by test software. The test software may enable signature capture and compare the captured signature(s) to the expected signature(s) that a working system would generate. The control signatures may be generated by a known working system or simulation. Before capture is enabled, the test software may set the value of the signature field to a "seed" value. The seed value(s) chosen for a particular test may correspond to the test image(s) being used with that test. Note that a different seed value may be stored in each SAR 995.

The test software may enable signature capture by setting a control field in the appropriate SACR 997 to a value that initiates capture. For example, after drawing a known image into the frame buffer and setting the signature in each SAR 995 to a seed value, the test software may assert a signature capture request field in the appropriate SACR 997. The SACR 997 may in turn provide signals to the SARs that cause the SARs to each generate a signature for the image.

Figure 24:
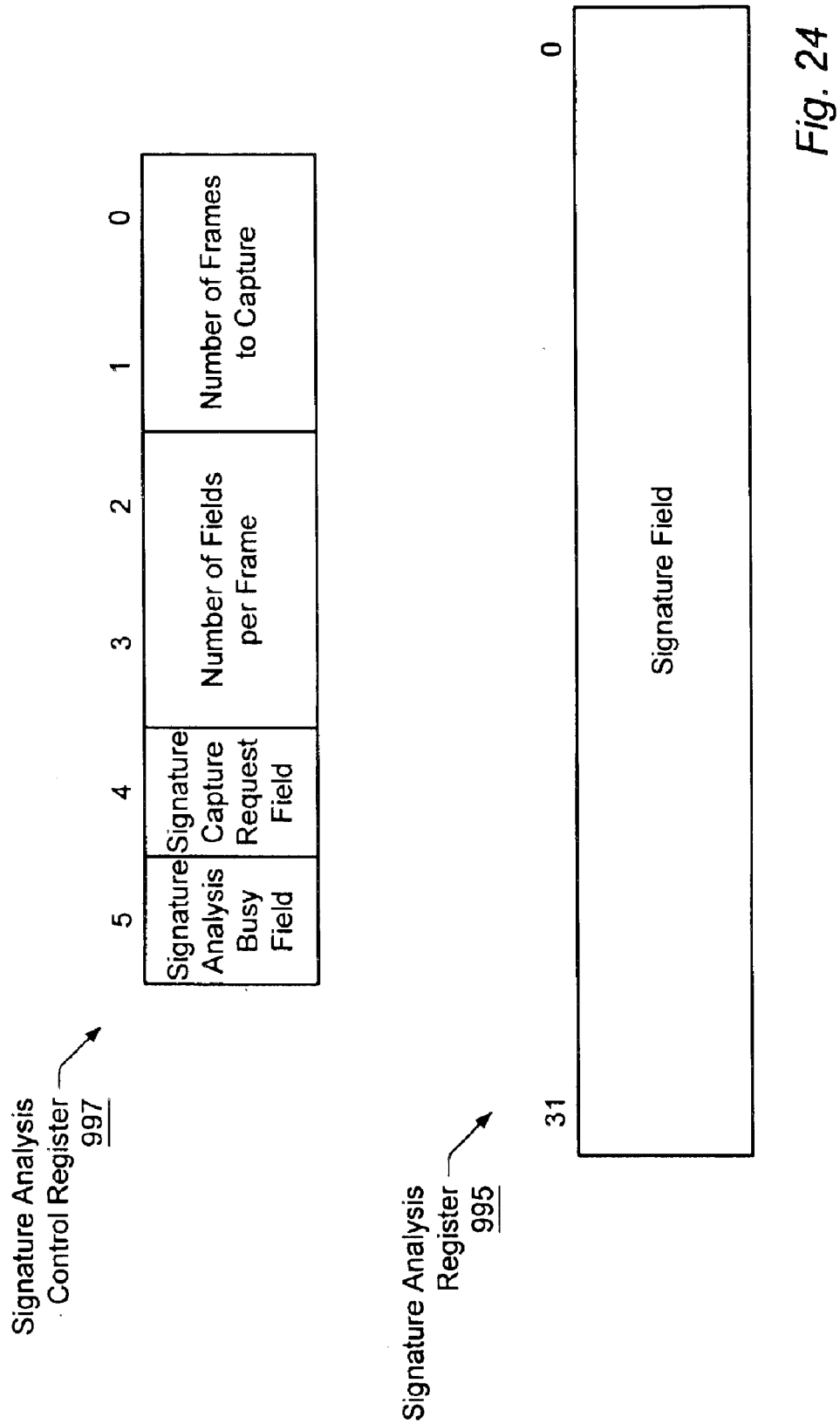
FIG. 24 shows one embodiment of a signature analysis register.

FIG. 24 shows how, in one embodiment, a SAR 995 may store a 32-bit signature. The SAR may be configured to capture both display information and control signals. For example, looking back at FIG. 23, the SARs 995C that are configured to capture display information as it is output from a respective display output queue (DOQ) 821 may also capture the control signals (e.g., synchronization and blanking signals) that are generated by a respective display timing generator (DTG) 971. If multiple frames are being captured, the SAR may continue to capture the control signals (e.g., the sync signals) during the horizontal and vertical blanking intervals.

FIG. 24 also shows one embodiment of a SACR 997. The SACR 997 may include multiple fields. One field may be a signature capture request field (e.g., bit 4 in FIG. 24). The signature capture request field may be set to a certain value in order to cause the SACR to provide signals that enable signature capture to each of the SARs. For example, in order to initiate a test, bit 4 may be set. In response, the SACR 997 may provide signals to each of the SARs, causing them to begin capturing data to add to their signatures beginning with the next frame of display information. After the display information is captured, the SACR may set the signature analysis busy field (e.g., bit 5 in FIG. 24) to a certain value, notifying the test software that the capture is complete. In another embodiment, the SACR may be configured set the signature analysis request field to a value that indicates that the signature analysis hardware is now idle. This way, a single field may be used to indicate both a request for signature capture and the completion of signature capture.

Each SACR 997 may also include a field that specifies how many fields or frames of data are to be captured. If multiple frames are to be captured, each SACR may have a field that identifies how many fields there are in each frame. Thus, before setting the signature capture request field to the value that enables capture, the test software may write the number of frames that are to be captured to the number of frames field. As each frame is captured, the SACR may decrement the number stored in the number of frames field. The SACR may provide signals to the SARs that cause them to stop capturing data after the display information in the final scan line of the final frame has been captured.

The SARs may continue to store the captured signature until the signature fields are cleared or until new seed values are written to the signature fields. In one embodiment, another capture may be requested using the previously captured signatures as the starting value (as opposed to storing a new seed value in each of the SARs) in order to capture more fields than were requested in the previous capture. Note that in some embodiments, instead of having separate SACRs, each SAR may also include the control fields shown in the SACR.

A SAR may be able to capture both interlaced and non-interlaced frames, as well as other frames that include multiple fields (e.g., field sequential color). A non-interlaced frame may include successive scan lines (e.g., 1024 successive lines of 1280 pixels each for a 1024×1280 CRT) that are all in the same field. In contrast, an interlaced frame may include two different fields. One field may include the even lines (e.g., lines 2, 4, 6, . . . 1024) and the other may include the odd lines (e.g., lines 1, 3, 5, . . . 1023). In field sequential color mode, each color (Red, Green, Blue) may be sent as a separate field. Accordingly, the SARs may be configured to capture multiple fields in each frame. Typically, all of one field may be sent to the display raster before any portion of another field is sent.

The SARs may be configured in several different ways in order to enable them to capture both interlaced and non-interlaced frames. In one embodiment, each SAR may capture one or more successive fields of display information (e.g., two frames if non-interlaced, one frame if interlaced) for each frame it is set to capture. In order to have repeatable results for interlaced frames, each SAR may be configured to begin capture on either an even or an odd field (so different frames may be designated even or odd in non-interlaced mode). In another embodiment, a SAR may be configured to capture two fields per frame if the frames are interlaced and one field per frame if the frames are not interlaced.

Each SAR may use various flow control signals related to the portion of the video output controller in which the SAR is located to determine when frames/fields begin and end. In one embodiment, if SAR A is capturing data as it is output from the frame buffer, SAR A may determine which part of a frame (beginning, middle, or end) a particular burst corresponds to based on signals associated with that burst. For example, the output processor's access to the frame buffer 22 may be controlled by a frame buffer interface (which may be included in the hardware accelerator 18). Once the frame buffer interface has directed the frame buffer 22 to output a burst of data in response to receiving a burst request from one of the display channels in the output processor, the frame buffer interface may assert or toggle a signal acknowledging the request. Thus, based on what type of burst is requested by each burst requester (e.g., first burst in a new field vs. next burst in the current field) and/or the acknowledgement signals from the frame buffer interface, SAR A may be able to identify the beginning and end of each field. Likewise, SAR C at the output of the display output queue may identify different portions of a frame based on the sync signals generated by the DTG 971. Furthermore, SAR C may capture these sync signals and add them to the signature. By doing so, the operation of the DTGs 971 may be verified.

In some embodiments, tokens may be sent through each display channel's pipeline after each field (e.g., in response to the frame buffer interface's acknowledgement of the final burst request in a field). These tokens may tell the SARs when to begin and end capture and allow the SARs to be able to track how many fields they have captured. These tokens may be similar to, or even the same as, the tokens used to update the raster parameter registers during the blanking interval. Alternatively, each pixel may include a tag identifying whether it is the first (or final) pixel in a field.

Similarly, in some embodiments, each SAR may be configured to capture display information for one particular display channel. The SARs may be configured to differentiate between the various display channels' data streams based on tags that accompany each item of display information. For example, each pixel may include a tag identifying which display channel the pixel belongs in. Thus, as pixels flow through the graphics system, each SAR may compare the tag of each pixel to an internal id tag that identifies which display channel each SAR corresponds to. If the tags do not match, the SAR may not capture the pixel.

Various algorithms may be used to add each new pixel in the frame(s) being captured to the signature. For example, one algorithm may involve XORing a captured pixel with all or part of the preexisting signature. In another embodiment, the SARs may be implemented as LHCAs (linear hybrid cellular automatons). Generally, a cellular automaton is a discrete dynamical system where the signatures in the each register are updated according to a local rule. The registers may be updated at discrete time intervals. Each register's value may depend on what its value was in the previous time step. Additionally, each register's state may also depend on the signatures in its neighbor registers in the previous time step.

Generally, signature algorithms may be chosen so that each different known test image has a (nearly) unique signature. This way, there is little chance that a flawed system will produce the correct signature. For this same reason, it may be useful to select an algorithm that is capable of capturing a large amount of data (e.g., multiple frames) without creating repetitive signatures. As more data is captured, the amount of error detection increases, since signature algorithms may often detect a single bit error in a single pixel within several frames of data.

Figure 25:
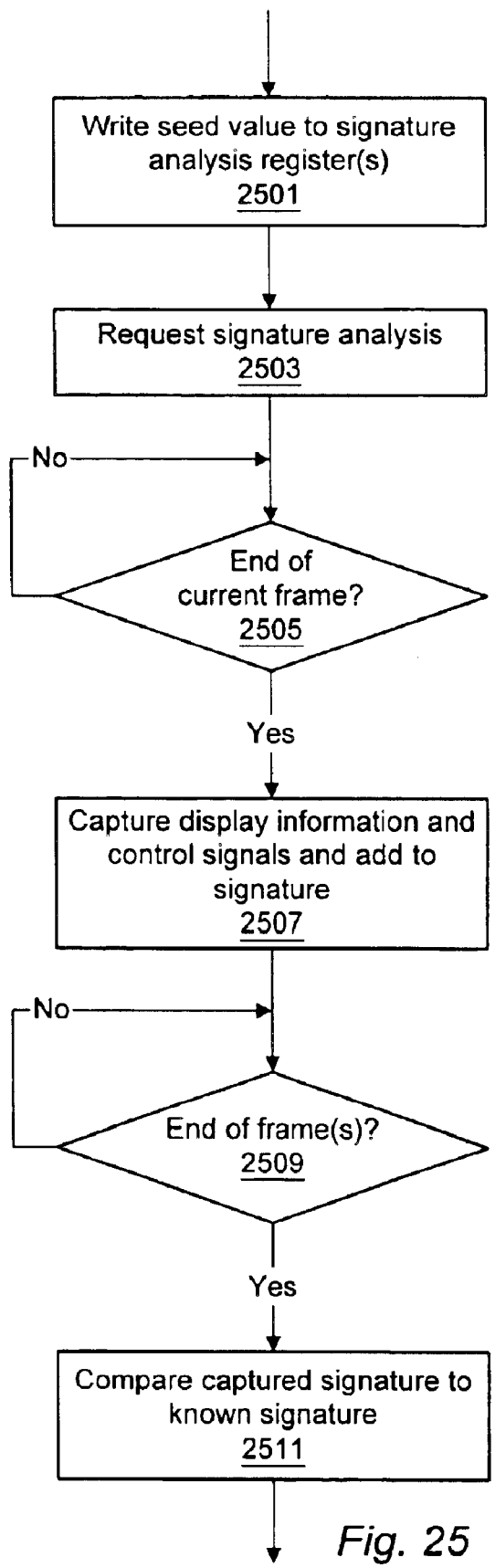
FIG. 25 shows one embodiment of a method of capturing a signature from a frame of display information.

FIG. 25 shows one embodiment of a method of using SARs to test various portions of a graphics system. In this embodiment, seed value(s) are written to the signature analysis register(s), as shown at 2501. For example, test software may write the seed values. When signature analysis is requested (at 2503), the signature analysis registers may wait until the current frame ends and then begin capturing at the start of the next frame, as shown at 2505 and 2507. For example, each SAR may wait for an end of frame (or end of field) token and then begin capturing display information and control signals. As display information and/or control signals are captured, a signature algorithm may be used to add the captured display information and control signals to the signature. Depending on how many frames the SARs were instructed to capture, the SARs may continue capturing until they have each captured all of the requested frame(s). Each SAR may begin and end capture based on flow control information (e.g., beginning and/or end of field/frame tokens) for a respective display channel. Once the SARs have captured the requested signatures, the captured signatures may be compared to known signatures that were generated by a known working system or by simulation, as indicated at 2511.

Numerous variations and modifications will become apparent to those skilled in the art once the above disclosure is fully appreciated. It is intended that the following claims be interpreted to embrace all such variations and modifications.

What is claimed is:

1. A graphics system, comprising:
  a frame buffer configured to store an image;
  one or more display devices each configured to display a portion of an image;
  one or more raster parameter registers, wherein the raster parameter registers are configured to store a plurality of control values that specify what portion of the image will be displayed on a respective one of the display devices;
  one or more raster parameter register updaters, wherein each raster parameter register updater is configured to update a respective one of the raster parameter registers by waiting for a current frame or field to end and, once the current frame or field has ended, writing an updated control value to the respective one of the raster parameter registers; and
  one or more shadow registers, wherein each shadow register corresponds to a respective one of the raster parameter registers, and wherein each of the raster parameter register updaters is configured to update its respective raster parameter register by copying a value from each shadow register to a respective raster parameter register.

2. The graphics system of claim 1, wherein the one or more raster parameter register updaters are configured to update the respective one of the raster parameter registers in response to a user initiating a panning operation for a respective one of the display devices.

3. The graphics system of claim 1, wherein each raster parameter register updater is configured to update its respective raster parameter register in response to receiving an end of field token.

4. The graphics system of claim 1, wherein each raster parameter register updater is configured to update its respective raster parameter register in response to receiving an end of frame token.

5. The graphics system of claim 1, wherein a first raster parameter register comprises a screen address register that is configured to store a value that indicates whether a next frame of display information for a respective one of the display devices starts on an even or an odd line in the frame buffer.

6. The graphics system of claim 5, wherein a first raster parameter register updater is comprised in a frame buffer interface, and where the first raster parameter updater is configured to update the first raster parameter register.

7. The graphics system of claim 1, wherein a first raster parameter register comprises a display address generator register that is configured to store the starting address of a respective display device's portion of the image within the frame buffer.

8. The graphics system of claim 1, wherein at least one of said raster parameter registers comprises a margin trimming register.

9. The graphics system of claim 1, wherein a first portion of the raster parameter registers affect display information in a first display channel and a second portion of the raster parameter registers affect display information in a second display channel.

10. The graphics system of claim 1, wherein a first portion of the shadow registers corresponds to a first display channel that outputs data to a first display device and a second portion of the shadow registers corresponds to a second display channel that outputs data to a second display device, and further comprising a computer readable medium that comprises computer-executable instructions configured to update the first portion of the shadow registers in response to a user initiating a panning operation for the first display device.

11. The graphics system of claim 1, wherein the plurality of control values for each display comprise: a horizontal burst count value, a margin trimming value, a screen address value, and a display address generator value, wherein the horizontal burst count specifies a number of bursts of display information to request to provide a single scan line for the specified portion of the image, the margin trimming value specifies where the portion of the image begins and ends within the bursts, the screen address value specifies whether the next frame of display information starts on an even or odd line, and the display address generator value specifies the starting address in the frame buffer for the specified portion of the image.

12. A method of panning, comprising:
storing an image in a frame buffer;
displaying a first portion of the image on a display, wherein the first portion is less than the entire image;
receiving an indication that initiates a panning operation to display a second portion of the image of the display, wherein performing the panning operation comprises updating one or more raster parameter registers;
writing one or more raster parameter register values to one or more corresponding shadow registers, in response to said receiving:
waiting for a current frame or field to finish; and
in response to the current frame or field finishing, updating the raster parameter registers during a next blanking interval.

13. The method of claim 12, wherein said waiting comprises waiting to receive an end of field token.

14. The method of claim 12, wherein said waiting comprises waiting to receive an end of frame token.

15. The method of claim 12, wherein a first raster parameter register comprises a screen address register that is configured to store a value that indicates whether a next frame of display information for a respective one of the display devices starts on an even or an odd line in the frame buffer.

16. The method of claim 12, wherein a first raster parameter register comprises a display address generator register that is configured to store the starting address of a respective display device's portion of the image within the frame buffer.

17. The method of claim 12, wherein a raster parameter register comprises a margin trimming register.

18. The method of claim 12, wherein a first portion of the one or more raster parameter registers affect display information in a first display channel and a second portion of the one or more raster parameter registers affect display information in a second display channel.

19. The method of claim 18, wherein the first display channel is configured as a controlling display channel, and wherein said waiting comprises waiting for a current frame or field in the controlling display channel to finish.

20. The graphics system of claim 9, wherein a first portion of the raster parameter updaters are configured to update the first and the second portion of the raster parameter registers.

21. The graphics system of claim 20, wherein the first display channel is a controlling display channel, and wherein the raster parameter registers are configured to wait for a current frame or field in the first display channel to end before writing the updated control value to the respective one of the raster parameter registers.

22. The graphics system of claim 10, wherein the computer-executable instructions are further configured to cause a first portion of the raster parameter register updaters to update the first portion of the raster parameter registers with the values stored in the first portion of the shadow registers.

23. The graphics system of claim 12, wherein the raster parameter register values for each display comprise: a horizontal burst count, a margin trimming value, a screen display value, and a display address generator value, wherein the horizontal burst count specifies a number of bursts of display information to request to provide a single scan line for the specified portion of the image, the margin trimming value specifies where the portion of the image begins and ends within the bursts, the screen address value specifies whether the next frame of display information starts on an even or odd line, and the display address generator value specifies the starting address in the frame buffer for the specified portion of the image.

* * * * *